United States Patent [19]
Brooks et al.

[11] Patent Number: 6,101,876
[45] Date of Patent: Aug. 15, 2000

[54] METHOD OF CENTERING A DISK PACK OF A DISK DRIVE

[75] Inventors: Peter Everett Brooks; Lance Allen Gabrielson, both of Rochester, Minn.

[73] Assignee: Western Digital Corporation, Irvine, Calif.

[21] Appl. No.: 09/103,791

[22] Filed: Jun. 24, 1998

Related U.S. Application Data

[63] Continuation-in-part of application No. 08/673,370, Jun. 28, 1996, Pat. No. 5,824,898.
[51] Int. Cl.[7] .............................. G01M 1/02; G11B 23/00
[52] U.S. Cl. ......................... 73/468; 360/98.08; 369/270
[58] Field of Search .............................. 73/468, 469, 471, 73/472, 473, 474, 475, 476, 477, 478, 479, 487, 461; 360/98.08, 99.05, 99.12, 99.09, 98.07; 369/75.2, 270, 271

[56] References Cited

U.S. PATENT DOCUMENTS

| | | | |
|---|---|---|---|
| 3,854,347 | 12/1974 | Hellerich | 74/574 |
| 4,224,648 | 9/1980 | Roling | 360/97 |
| 4,561,035 | 12/1985 | McDorman et al. | 73/468 |
| 4,683,505 | 7/1987 | Schmidt et al. | 360/98 |
| 4,764,828 | 8/1988 | Gollback | 360/98 |
| 4,933,927 | 6/1990 | Ross | 29/406 |
| 4,949,579 | 8/1990 | Nayar | 73/468 |
| 5,043,973 | 8/1991 | Ocheltree et al. | 369/270 |
| 5,422,776 | 6/1995 | Thorson et al. | 360/98.07 |

*Primary Examiner*—Helen C. Kwok
*Attorney, Agent, or Firm*—Milad G. Shara

[57] ABSTRACT

A method of centering a disk pack on a base rotatably supporting the disk pack includes performing a series a steps while the disk pack is rotating. A reference timing signal is generated. A first imbalance in the rotating disk pack is detected, and a first imbalance signal is produced. The first imbalance signal is correlated with the reference timing signal to produce a first correlation value, which indicates a location of the first imbalance relative to the reference timing signal. Based upon the first correlation value, a first impact is applied to the base, causing the base to shift relative to the disk pack. As a result of the first impact, the first imbalance moves to a second imbalance. The second imbalance is detected, and a second imbalance signal is produced. The second imbalance signal is correlated with the reference timing signal to produce a second correlation value, which indicates a location of the second imbalance relative to the reference timing signal. A phase compensation value is also determined, based upon the first and second correlation values. The phase compensation value indicates a phase difference between an actual location of the first imbalance and a desired location of the first imbalance when the first impact was applied. Based upon the phase compensation value, a second impact is applied to the base, again causing the base to shift relative to the disk pack.

14 Claims, 20 Drawing Sheets

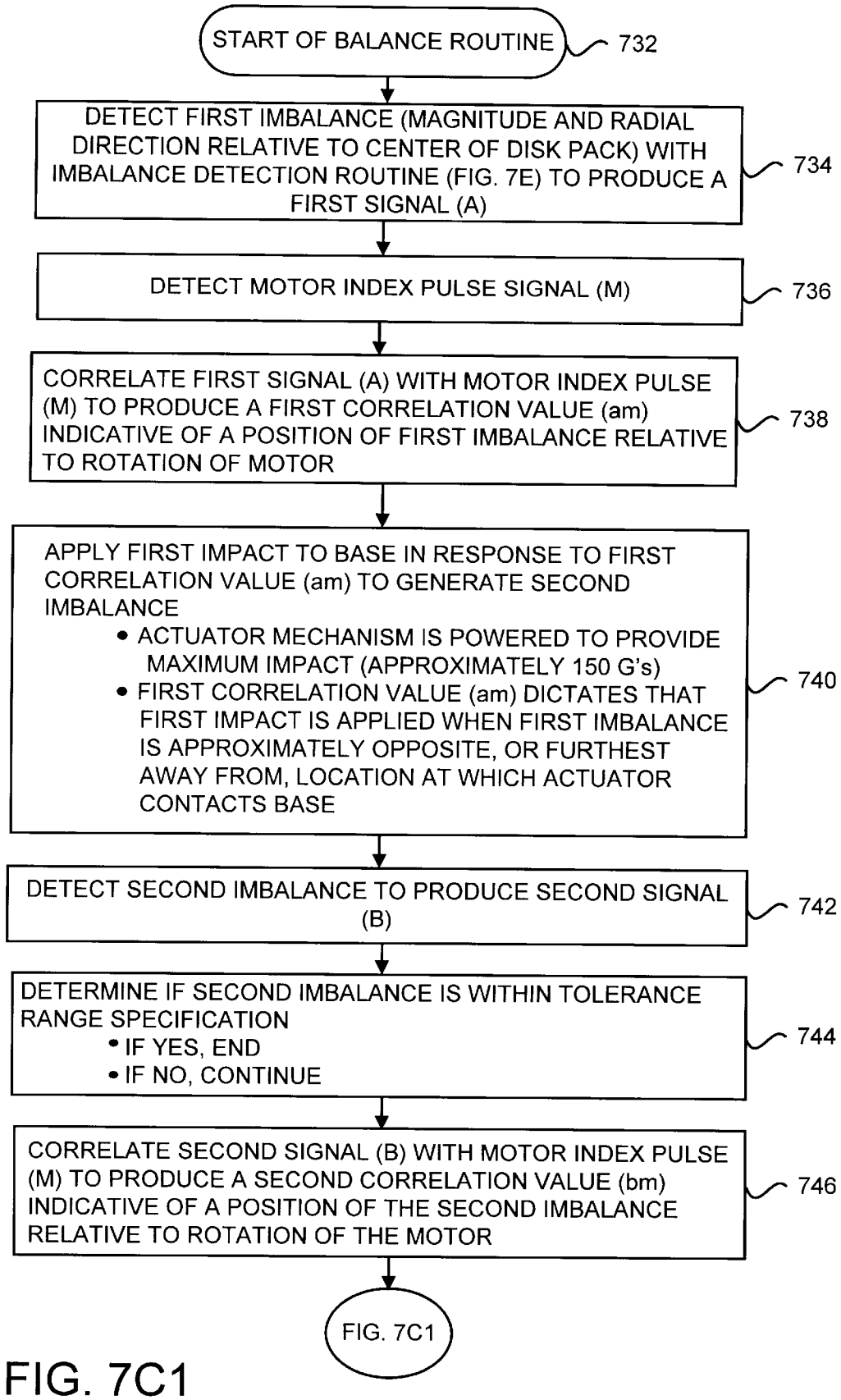
FIG. 7C1

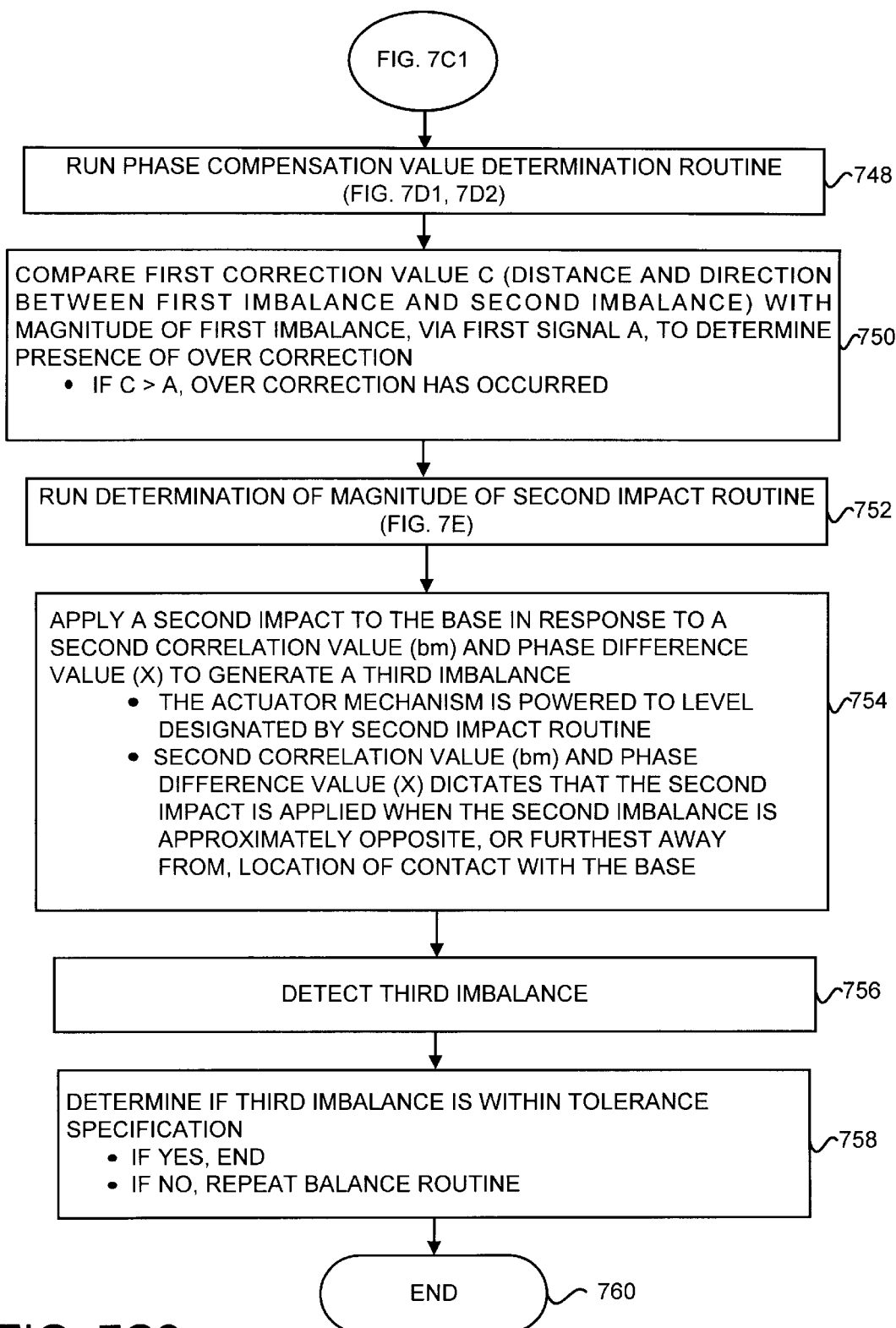
FIG. 7C2

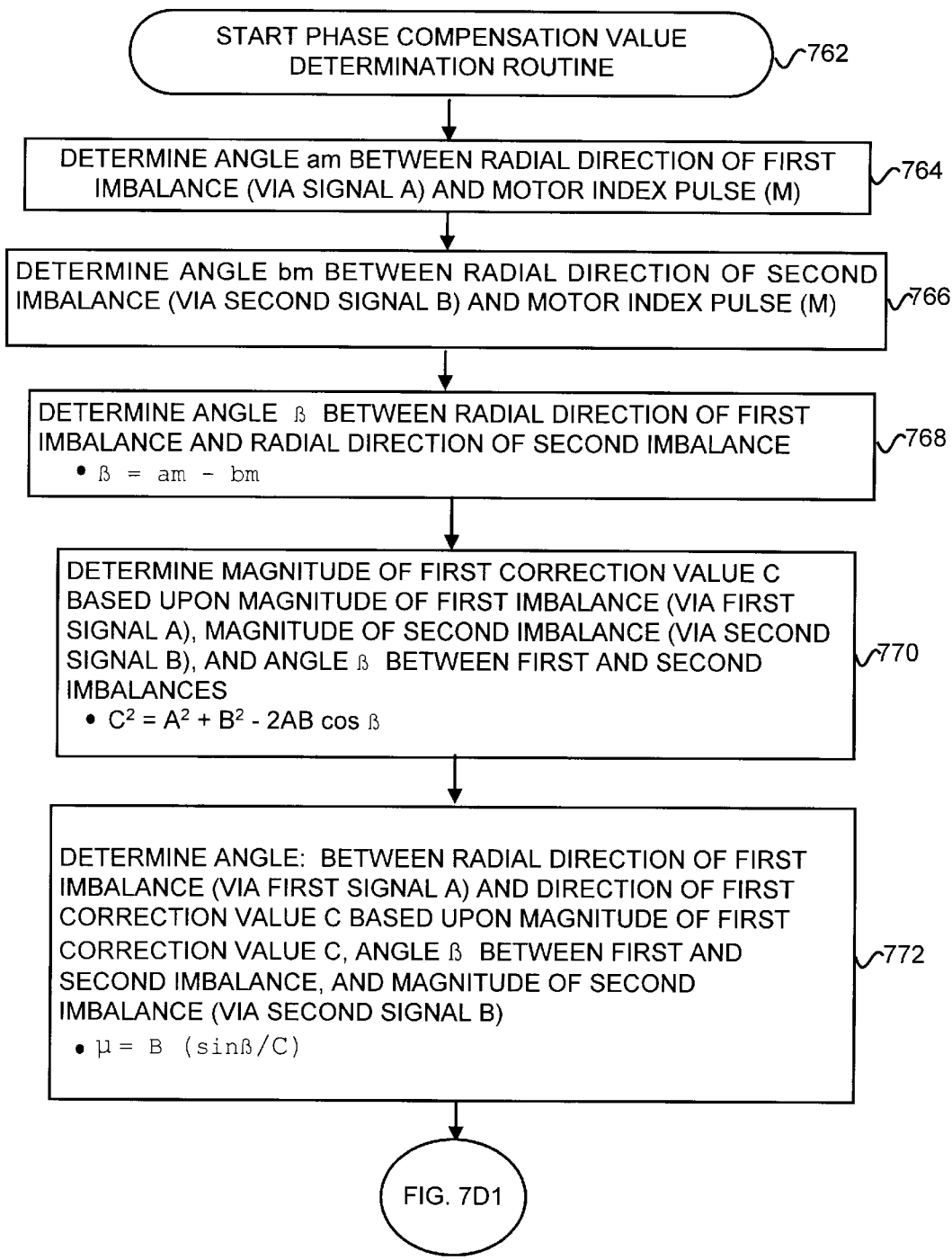
FIG. 7D1

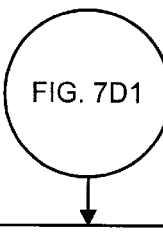

```
                    ┌─────────────┐
                    │  FIG. 7D1   │
                    └──────┬──────┘
                           │
                           ▼
┌─────────────────────────────────────────────────────────┐
│ DETERMINE PHASE DIFFERENCE X BETWEEN DESIRED AND        │
│ ACTUAL TIMING OF FIRST IMPACT BASED UPON ANGLE μ        │── 774
│ BETWEEN FIRST IMBALANCE AND FIRST CORRECTION VALUE C    │
│     • X = μ                                             │
└──────────────────────────┬──────────────────────────────┘
                           ▼
┌─────────────────────────────────────────────────────────┐
│ COMPARE ANGLE am BETWEEN FIRST IMBALANCE AND            │
│ MOTOR INDEX PULSE WITH ANGLE bm BETWEEN SECOND          │
│ IMBALANCE AND MOTOR INDEX PULSE TO DETERMINE            │── 776
│ WHETHER FIRST IMPACT WAS EARLY OR LATE                  │
│     • IF am > bm, THEN FIRST IMPACT WAS LATE            │
│     • IF am < bm, THEN FIRST IMPACT WAS EARLY           │
└──────────────────────────┬──────────────────────────────┘
                           ▼
┌─────────────────────────────────────────────────────────┐
│ DETERMINE PHASE COMPENSATION VALUE                      │
│     • CONVERT X INTO AN ARC LENGTH DISTANCE             │
│     • CONVERT ARC LENGTH DISTANCE INTO TIME VALUE T     │
│       BASED UPON KNOWN ROTATIONAL SPEED OF MOTOR        │
│     • DIVIDE T BY 2                                     │── 778
│     • ASSIGN POSITIVE OR MINUS TO T/2 BASED UPON        │
│       DETERMINATION OF WHETHER FIRST IMPACT WAS EARLY   │
│       OR LATE                                           │
└──────────────────────────┬──────────────────────────────┘
                           ▼
                    ╭─────────────╮
                    │     END     │── 780
                    ╰─────────────╯
```

FIG. 7D2

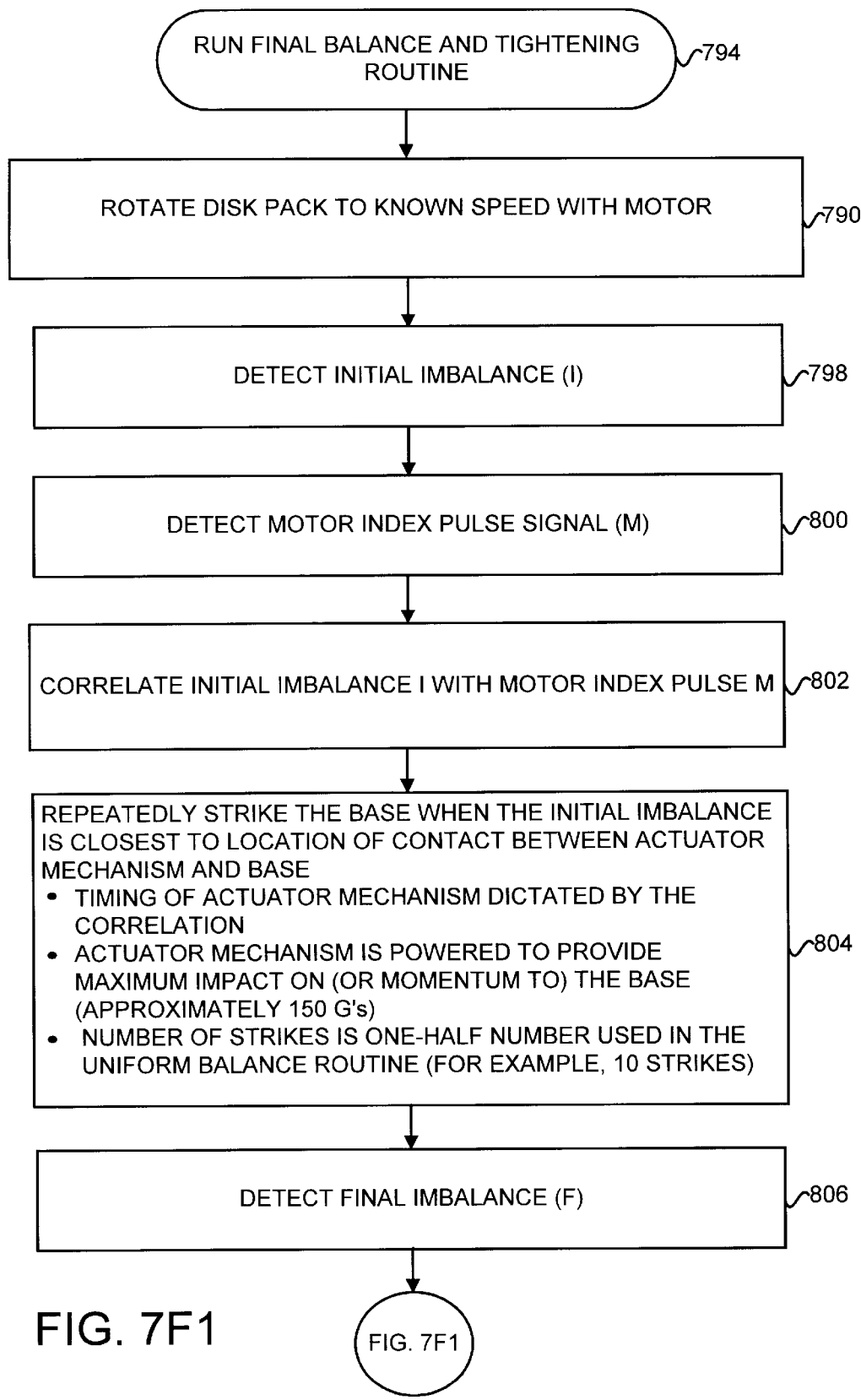
FIG. 7F1

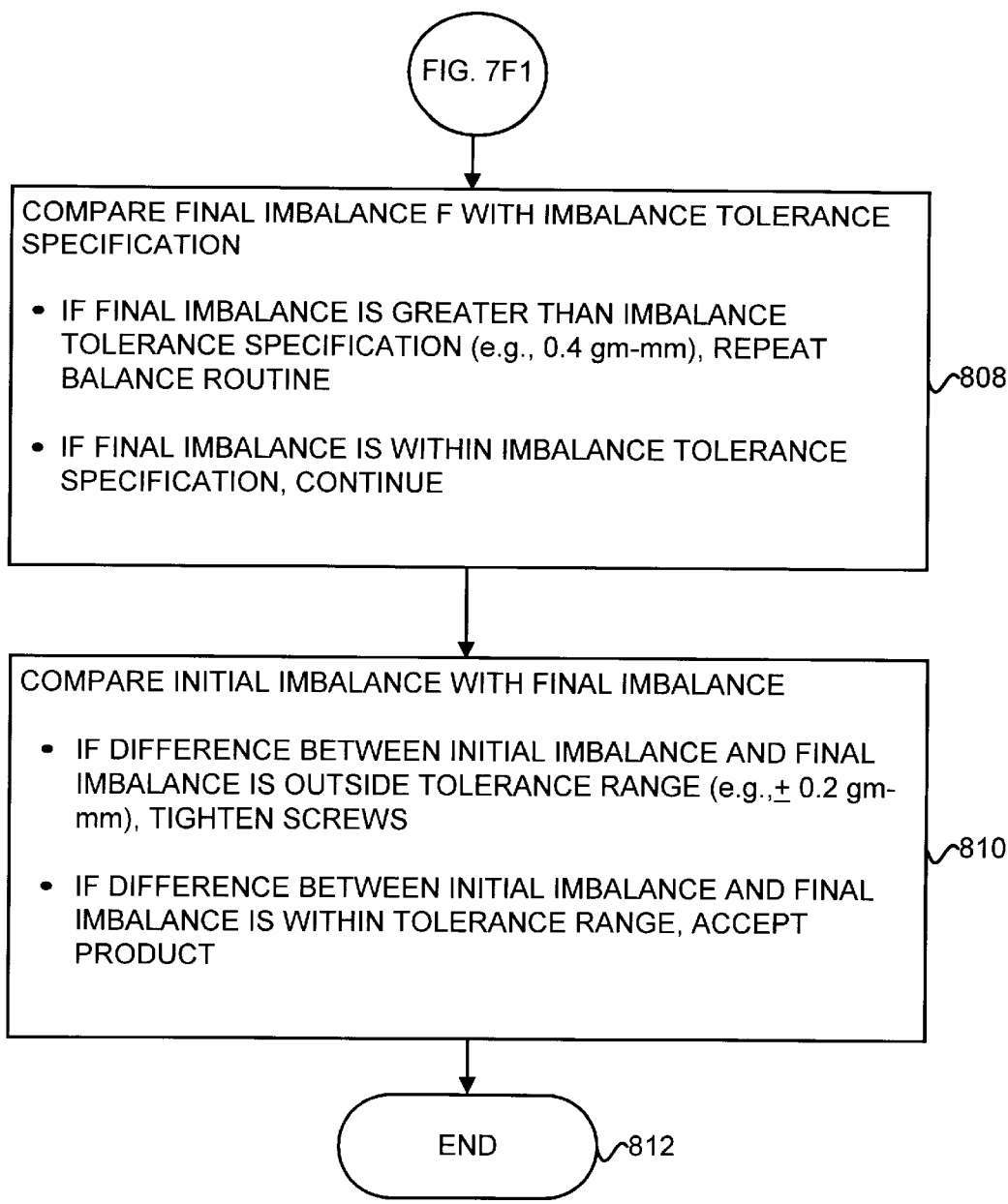
FIG. 7F2

METHOD OF CENTERING A DISK PACK OF A DISK DRIVE

CROSS REFERENCE TO CO-PENDING APPLICATION

This is a continuation-in-part of application Ser. No. 08/673,370, filed on Jun. 28, 1996 U.S. Pat. No. 5,824,898.

BACKGROUND OF THE INVENTION

1. Field of the Invention

The present invention relates to balancing rotating objects, and in particular to balancing rotating objects by shifting them.

2. Description of the Prior Art and Related Information

Hard disk drive storage devices have been used as a secondary storage device for computer systems for many years. They provide inexpensive, high capacity digital storage with the ability to quickly access data stored on the drive. A typical hard disk drive comprises a housing with one or more magnetic disks separated by spacers mounted on a motor driven spindle hub which in turn is supported on a base. Data is stored on the disks by changing the magnetization of small areas on the disks called domains. The domains are written and read by magnetic transducers mounted on the end of suspensions which are coupled to a rotary actuator positioned to one side of the disks. The rotary actuator moves the transducers radially over the surfaces of the disks. Data on the disks are written in substantially parallel concentric tracks, with information, called servo information designed to be detected by the transducers and used to control the radial position of the transducer so that it can move across tracks of data and follow a track of data.

It is crucial that the mass of the disks and spacers be balanced on the spindle hub so that they do not cause significant vibration of the disk drive when rotated at high speed. Typical disks rotate at between 6,000 to 8,000 revolutions per minute (RPM) and higher. An out of balance condition in the rotating disk assembly causes erratic speed variations with respect to the tracks and heads which results in read/write errors. Planar and axial vibrations of the disk surfaces can also contribute to head crashes, harming both the disk surface and the head. Disks which significantly vibrate when rotating also increase track misregistration, cause annoying acoustical emissions (noise) and a reduction in the life of spindle bearings. When such disk drives are used in an array of disk drives, the mechanical vibrations of the multiple drives can synchronized, resulting in unacceptable vibration of the array. There is a need to ensure that the disks are centered and balanced when clamping them to the spindle hub to avoid these problems.

There have been several attempts to accurately center and or balance the disks to minimize rotational vibrations. In addition to designing and manufacturing disks and hubs to tight tolerances, there were many attempts to balance disk stacks and hubs by adding or removing material, as well as using mechanisms to shift one or more elements in the stack to alternate nominal positions as in U.S. Pat. No. 4,683,505 to Schmidt et al. U.S. Pat. No. 5,422,776 to Thorson et al. measures the imbalance of a disk stack and hub at operational speed. Plugs of varying weights are then inserted into free screw holes at the top of the hub to minimize the imbalance. This method takes a significant amount of operator time and intervention. It can take several different plugs of varying weight established by iterative spinning and stopping of the disk stack. Each screw also has the potential to generate particles which can damage the head.

U.S. Pat. No. 4,933,927 to Ross uses a contact element applied to the disks outer diameter which is slowly moved away from the disks as they begin to rotate. This method, as in the '505 patent attempts to balance the disk stack by modifying the position of the elements about the hub to nominal positions. A method of balancing the disk pack is needed which does not require the addition or subtraction of mass from the disk pack, and which takes into account the actual mass imbalance of the combination of disk stack and hub. Such a method must be repeatable from drive to drive during a simple manufacturing process with minimal operator intervention.

SUMMARY OF THE INVENTION

The present invention can be regarded as a method of centering a disk pack of a disk drive. The disk drive includes a base rotatably supporting the disk pack. The method comprises rotating the disk pack and performing a series of steps while the disk pack is rotating. First, a reference timing signal is generated. A first imbalance in the rotating disk pack is then detected, from which a first imbalance signal is produced. The first imbalance signal is correlated with the reference timing signal to produce a first correlation value. The first correlation value is indicative of a location of the first imbalance relative to the reference timing signal. The method further comprises applying a first impact to the base to transfer sufficient momentum to the base causing the base to shift relative to the disk pack. Application of the first impact is based upon the first correlation value. As a result of the first impact, the first imbalance will move to a second imbalance. This second imbalance is detected, from which a second imbalance signal is produced. The second imbalance signal is then correlated with the reference timing signal to produce a second correlation value. The second correlation value is indicative of a location of the second imbalance relative to the reference timing signal. The method further comprises determining a phase compensation value based upon the first and second correlation values. The phase compensation value is indicative of a phase difference between an actual location of the first imbalance and a desired location of the first imbalance when the first impact was applied. Finally, the method comprises applying a second impact to the base to transfer sufficient momentum to the base causing the base to shift relative to the disk pack. Application of the second impact is based upon the phase compensation value.

BRIEF DESCRIPTION OF THE DRAWINGS

FIGS. 7A–7G are flowcharts describing an alternative method of registering and centering the disk pack of FIG. 1, including calculation of a force to be applied to center the disk pack.

DESCRIPTION OF THE PREFERRED EMBODIMENTS

Figure 1:
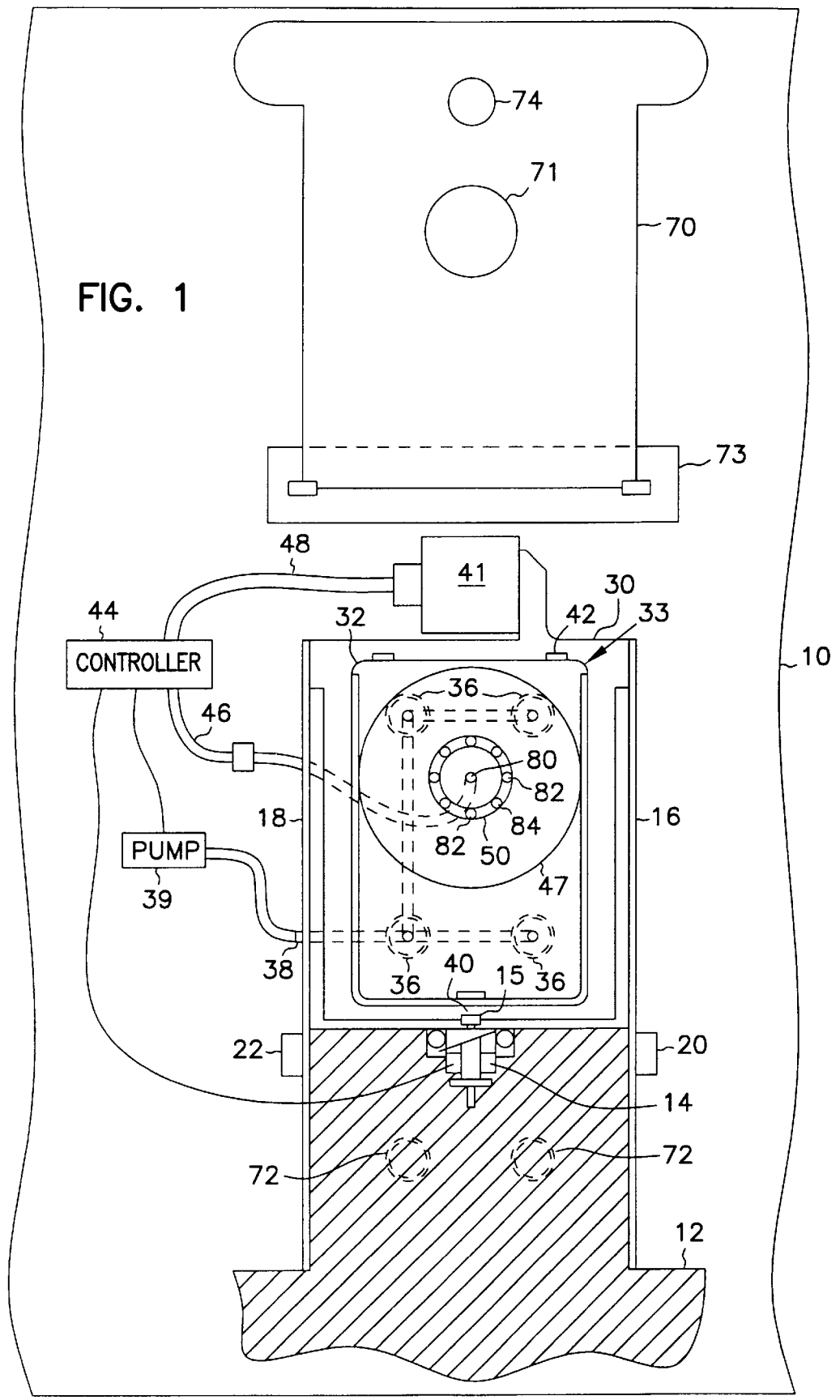
FIG. 1 is a top view of a fixture used for centering a disk pack on a disk drive.

A fixture for balancing a rotating mass such as a pack of disks and spacers is indicated generally at 10 in FIG. 1. The fixture 10 comprises a block 12 supporting a solenoid 14 which drives a hammer 15 with a controlled momentum transferring force. A pair of leaf springs 16 and 18 are supported by the block 12 at first ends via clamps 20 and 22. The leaf springs 16 and 18 extend away from block 12 in the direction of motion of the hammer 15, and are coupled to a flex deck 30 at their second ends. The leaf springs 16 and 18 permit free movement of the flex deck 30 in substantially a single dimension. Other arrangements which allow measurement of movement or forces caused by a rotating mass will be apparent to those skilled in the art. One further example includes the use of a rigid mount with force sensors on the mounts to measure the forces exerted on them by the rotating mass. Such forces may be processed to determine magnitude and phase of such forces in relation to the rotating mass.

The flex deck 30 is constructed of a low mass material such as plastic (acetal), metal or wood. Its mass is small compared to the mass of the block 12 to allow it to move freely along a single axis as defined by the leaf springs. The axis of movement is perpendicular to the direction of motion of the hammer.

The flex deck 30 comprises a plate formed with a depression corresponding to a base casting 32 of a disk drive 33. The flex deck 30 has a plurality of suction cups 36 placed or distributed thereon and aligned with suitable portions such as flat areas of the base 32 to secure the base casting 32 during operation. A vacuum port 38 is coupled to a pump 39 and corresponding tubing is integrated into the flex deck 30 to provide a suction of about minus 14 PSI to secure the base casting 32. Alternative methods of clamping the base casting 32 to the flex deck 30, such as standard mechanical clamps will be apparent to those skilled in the art.

A front elastomer datum 40 is provided in the depression of the flex deck 30 to space the base casting 32 an appropriate fixed distance from the solenoid 14 and hammer 15 which travels a consistent distance when activated prior to striking the base casting 32. Note that the leaf springs 16, 18 allow movement of the flex deck 30 and hence the base casting 32 in a direction perpendicular to the movement of the hammer 15 such that the base casting 32 distance to the hammer 15 is fairly constant and fixed. The depression and datum 40 are formed so that the hammer 15 will strike the base casting 32 in a desired position, preferably approximately through its center of mass. At least one elastomer biasing pad 42 is provided on the opposite side of the depression to ensure that the base casting 32 is properly registered with the datum 40. Note that other methods of imparting momentum transferring force on the base casting 32, such as an actuator delivering a measured and controllable momentum transferring force under program control or a piezoelectric device under computer control will be apparent to those skilled in the art.

A unidirectional displacement transducer 41 such as an accelerometer is mounted to the flex deck 30 to measure vibration causing displacement about a single axis of vibration which corresponds to the motion allowed by the leaf springs 16, 18. The sensor 41 provides a resolution to almost a millionth of an inch. Other types of sensors may also be used to detect imbalance, such as accelerometers, laser Doppler based sensors, displacement sensors and others as will be apparent to one skilled in the art.

The base casting 32 of the disk drive 33 supports a motor and hub assembly with suitable electrical contacts mating corresponding contacts in the flex deck 30, which are then routed to a controller 44 via bus 46. A disk pack 47 for a disk drive is rotated by a spindle motor (not shown) located either below the disk pack 47 or concentric thereto under control of the controller. Such motor and hub combinations, as well as other combinations of motors and hubs are well known in the art. The disk pack 47 is initially lightly coupled to the hub which is located within equal sized central circular openings in the disks and spacers via a clamp 50. The controller 44 causes the motor to rotate the hub and thus the disk pack 47 at about ½ normal operating speed, and the transducer 41 provides the electrical signal on line 48 representative of vibrations caused by imbalance of the motor, hub and disk pack 47. Other rotational speeds will also be apparent to those skilled in the art. The controller 44 then directs the solenoid 14 to apply a sufficient momentum transferring force via the hammer 15 to the base 32 to cause the disk pack 47 to shift as a unit relative to the base 32 in a manner designed to reduce the imbalance and hence the vibrations. The magnitude of the momentum transferring force is sufficient to subject the base casting 32 to an acceleration in the range of approximately 50 to 150 Gs, transferring sufficient momentum to the base casting 32 to cause the disk pack 47 to shift relative to the base casting 32. Multiple instances of momentum transferring force are applied at selected times until the vibrations are within a predetermined value. The disk pack 47 is then fixedly coupled to the hub. In an alternate embodiment, the momentum transferring force is directly controllable by an operator, and selected based on the sensed magnitude of imbalance and a desired shift.

In one embodiment, the transducer 41 comprises a Balmac Billiard Ohio, USA) Vibration Analyzer Model 216-D which provides an analog voltage signal of up to 600 millivolts on line 48 representative of the displacement caused by the imbalance. In addition, the zero crossings of a further voltage signal provided by the transducer 41 represent the position of maximum imbalance and are used to generate the timing signals to correlate the solenoid 14 actuations. In a further embodiment, such timing signals are obtained from a further sensor placed to detect the timing of the hammer 15 striking the base casting 32.

In one embodiment of the invention, the disk pack 47 is placed over the hub and lightly coupled thereto by the clamp 50. The clamp 50 is tightened just enough to permit movement of the disk pack 47 with sufficient momentum transferring force applied to the base 32. The clamping force is highly dependent on the mass of the disk pack 47 and its reaction to displacement force from the hammer 15. A single disk must be clamped lightly because it has very little mass. A larger stack of disks can be tightened to about ½ the final desired force due to its larger mass and hence larger momentum to overcome the clamping force. It is desirable to have as large a clamping force as feasible to prevent disks from shifting during final tightening steps.

Based on the analog sinusoidal feedback signal provided on line 48 from the transducer 41 indicative of magnitude of displacement and timing of the displacement while the disk pack 47 is rotated at approximately 3000 rpm, the controller 44 causes the solenoid hammer 15 to repeatably strike the base 32 with sufficient momentum transferring force to shift the disk pack 47 relative to the hub and to bias the disk pack 47 against one side of the hub. The momentum transferring force is varied to impart an acceleration of between approximately 50 to 150 Gs to the base 32. This causes acceleration of the base casting 32 and not the disk pack 47 to cause a shift of the pack 47 to register all parts of the disk pack 47 against the hub. This results in all the disks and spacers in the disk pack 47 having substantially concentric center openings of substantially equal inner diameter. Following this inner diameter registration the base 32 is repeatably struck as a function of measured vibration and rotational delay substantially opposite the center of rotating mass to shift the disk pack 47 into a position which minimizes rotational vibration. The clamp 50 is then tightened to prevent further shifting of the disk pack 47.

The amount of Gs which can be applied to the base 32 is limited on the high end by that which might cause damage to bearings. About ½ the force which might cause bearing damage is set as the upper limit. The lower limit is a function of mass and clamping force, and should be the lowest amount calculated to still cause a shift of the disk pack 47 relative to the hub. While 50 to 150 Gs is used in one embodiment, it may vary significantly with other devices.

The speed at which the disk pack 47 is rotated is also quite variable. While 3000 rpm is used, it is desirable to keep it just above the fundamental frequency of vibration of the disk drive 33 to optimize the movement caused by imbalance so that it can be more easily sensed. This frequency will also likely vary from device to device. For timing accuracy, the rotation speed should be kept as low as possible, but still far enough above the fundamental frequency to avoid runaway vibrations.

Figure 2:
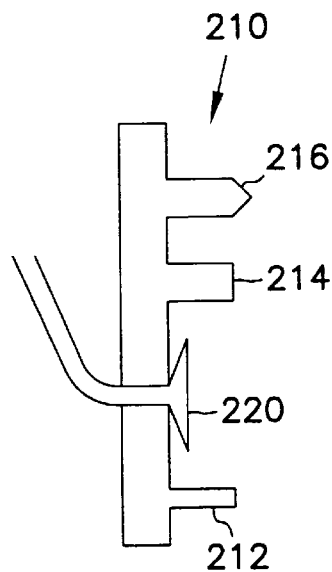
FIG. 2 is a front elevation view of a stabilizer used in conjunction with the fixture of FIG. 1.

In a further embodiment of the invention, a hinged cover plate 70 (not shown precisely to scale) is provided to shield an operator and also provide registration surfaces for a hub stabilizer shown generally at 210 in FIG. 2. The cover plate 70 is formed of a clear poly and comprises a first opening 71 spaced from the hinges (not shown) to provide access to the clamp 32 from above. The cover plate 70 is supported by a second mass 73 disposed adjacent the sensor 41 to allow the cover plate 70 to be moved down on top of the fixture 10 substantially horizontally and is long enough to be held in place by two further suitably plumbed suction cups 72 disposed in mass 12 and coupled to pump 39.

The stabilizer 210 comprises an elongate bar of lightweight material having a first extension 212 for mating with a second opening 72 in cover plate 70 which will be located over the base casting 32 where the hammer 15 contacts it when in closed position. A guide 214 is formed with a registration projection to fit within the first opening 71 and accurately position a hub stabilizer projection 216 in a center depression 80 of the hub with first extension 212 fitting in hole 74. A suction cup 220 coupled to the vacuum pump 39 holds the stabilizer 210 in place to stabilize the hub while the base casting 32 is being struck by the hammer 15.

Figure 3:
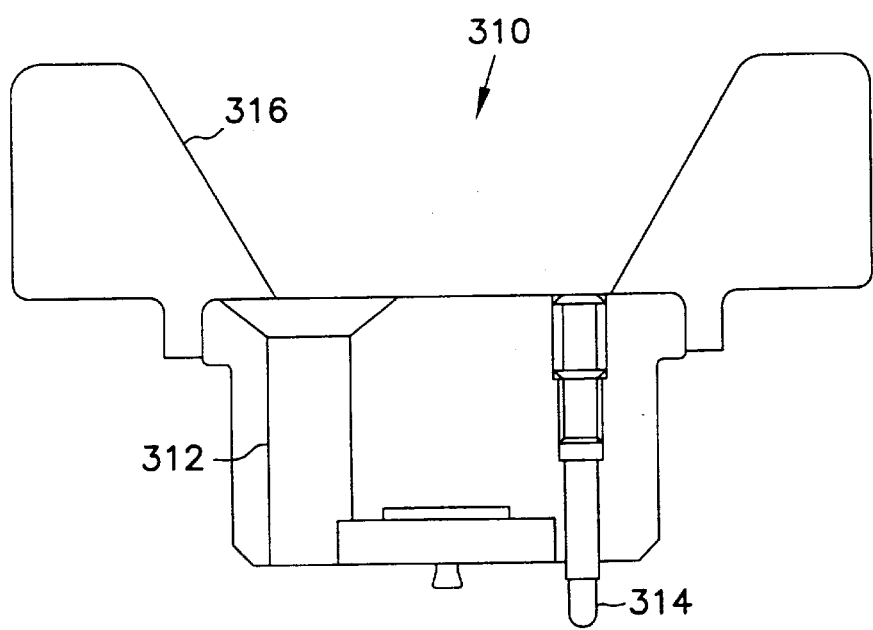
FIG. 3 is a front cross section view of an antirotation guide for use in conjunction with the fixture of FIG. 1.

Referring back to FIG. 1, the clamp 50 comprises four equidistantly dispersed screw holes 82 near its outer diameter, with a registration hole 84 between each screw hole. The screw holes 82 are aligned with corresponding suitably threaded holes in the hub. Screws are used to obtaining the light coupling and then further tightened to fully clamp the disk pack 47 to the hub and motor. A guide indicated generally at 310 in FIG. 3 is placed in the opening 71 in the cover plate 70 to correctly align and hold the clamp 50 for tightening of the screws. The guide 310 is formed in a shape to fit securely in the opening 71, and has holes 312 formed therethrough corresponding to each screw hole, and at least two dogs 314 formed therein for mating with two of the registration holes 84 in the clamp 50 and corresponding tooling holes in the motor beneath the clamp 50 to properly align the holes with the screws and to prevent rotation of the clamp 50 and motor when rotating the screws. Projections 316 permit easy handling and placement by an operator.

Controller 44 in one embodiment comprises standard personal computer components including standard circuitry provided with the sensor 41 and coupled to receive and convert to digital format, signals from the sensor 41 and an operator switch (not shown), and provide control signals to the vacuum pump 39, the solenoid 14 and the spindle motor of the disk drive 33. Controller 44 also comprises programmable logic controller (PLC) circuitry for simultaneous sensing parameters via sensors and processing of selected variables. It is well understood by those skilled in the art that the functions performed by controller 44 may be performed by many different types of circuitry. Through a program written under an application called Lab View from National Instruments running under Microsoft Windows, the following flow diagram of FIGS. 4A, 4B, 4C and 4D is implemented. Note that operator interaction with the program and system 10 are included in the flow diagram as will be readily apparent to one skilled in the art.

Following start 420, the operator places the base casting in the flex deck at 422 and closes the cover at 424 and installs the stabilizer. Then, upon activating a palm switch at 426, the PLC turns on the vacuum to the base casting and turns off the vacuum to the stabilizer and starts the disk drive motor at 428. The PLC then turns control over to the personal computer 430 which starts control of the system at 432. A vacuum sensor may be coupled to the PLC to provide an indication of whether a vacuum is present in order to continue. An imbalance subroutine is then branched to at 440 to bias the disk pack by creating an imbalance to align all the disks and spacers against the hub as previously described. The resulting imbalance desired is approximately 1 gm-mm but preferably greater than 0.8 gm-mm. It is created in approximately 4 seconds in this embodiment which is further described in FIG. 4C. At block 442 a balance subroutine (FIG. 4D) is branched to balance the disk pack. Following the balancing routine a signal is sent to the PLC indicating that all is done at 444. The PLC then turns off the disk drive motor at 446. The operator then removes the stabilizer at 450, tightens the screws to ½ torque using the four bit driver at 452 and then finishes applying torque with a manual driver at 454 to tighten the screws to secure the clamp. To ensure that a proper balance was obtained, the operator replaces the stabilizer at 456 and activates the palm switch at 458. The PLC then spins up the motor at 460 for a final balance check. The operator will then record the balance and activate the palm switch again at 462, causing the PLC to stop the motor and release the cover to complete the balancing operation at 464.

Figure 4A:
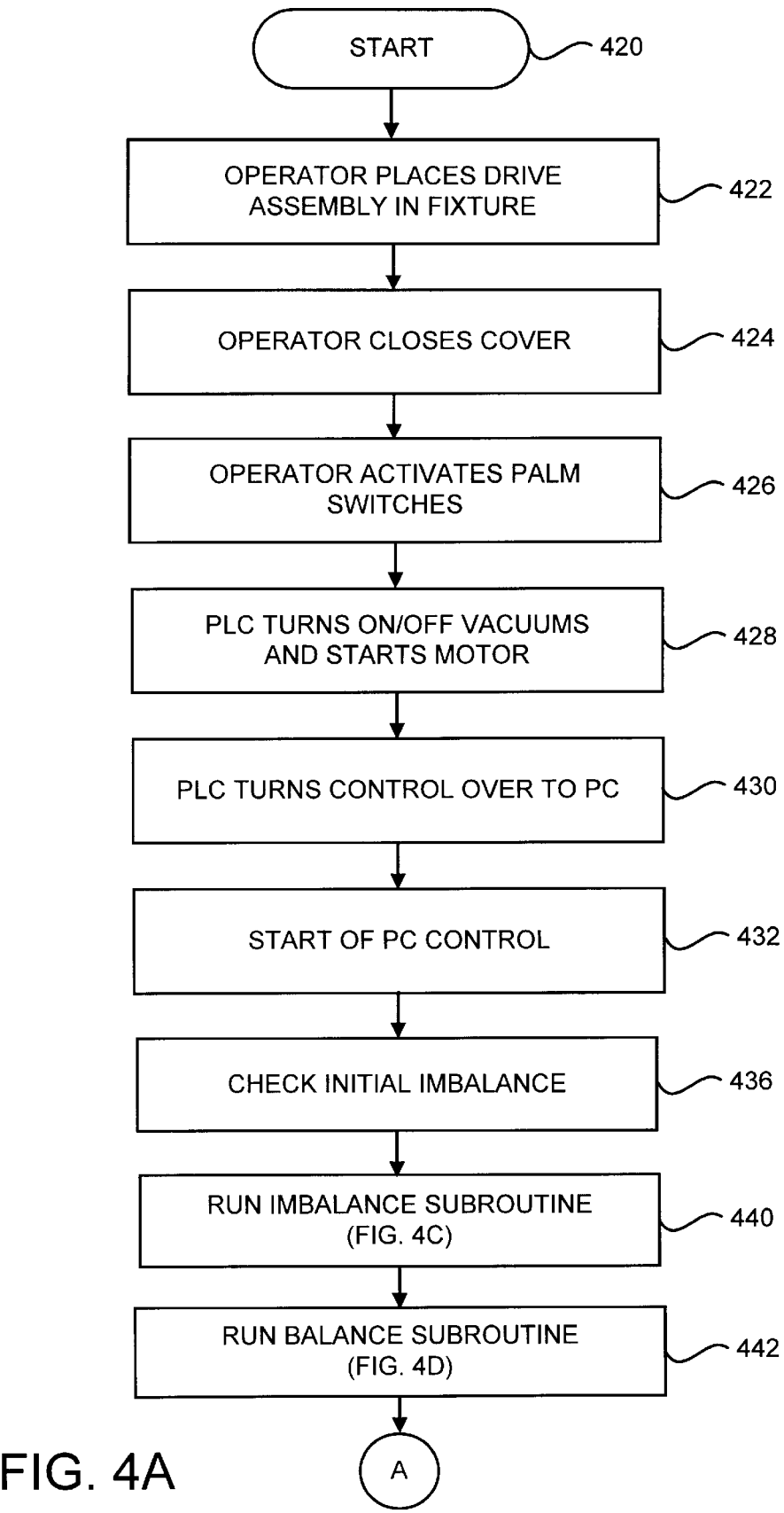
FIGS. 4A, 4B, 4C and 4D are flowcharts describing a registration and centering process and calculation of force to be applied to center the disk pack of FIG. 1.
Figure 4B:
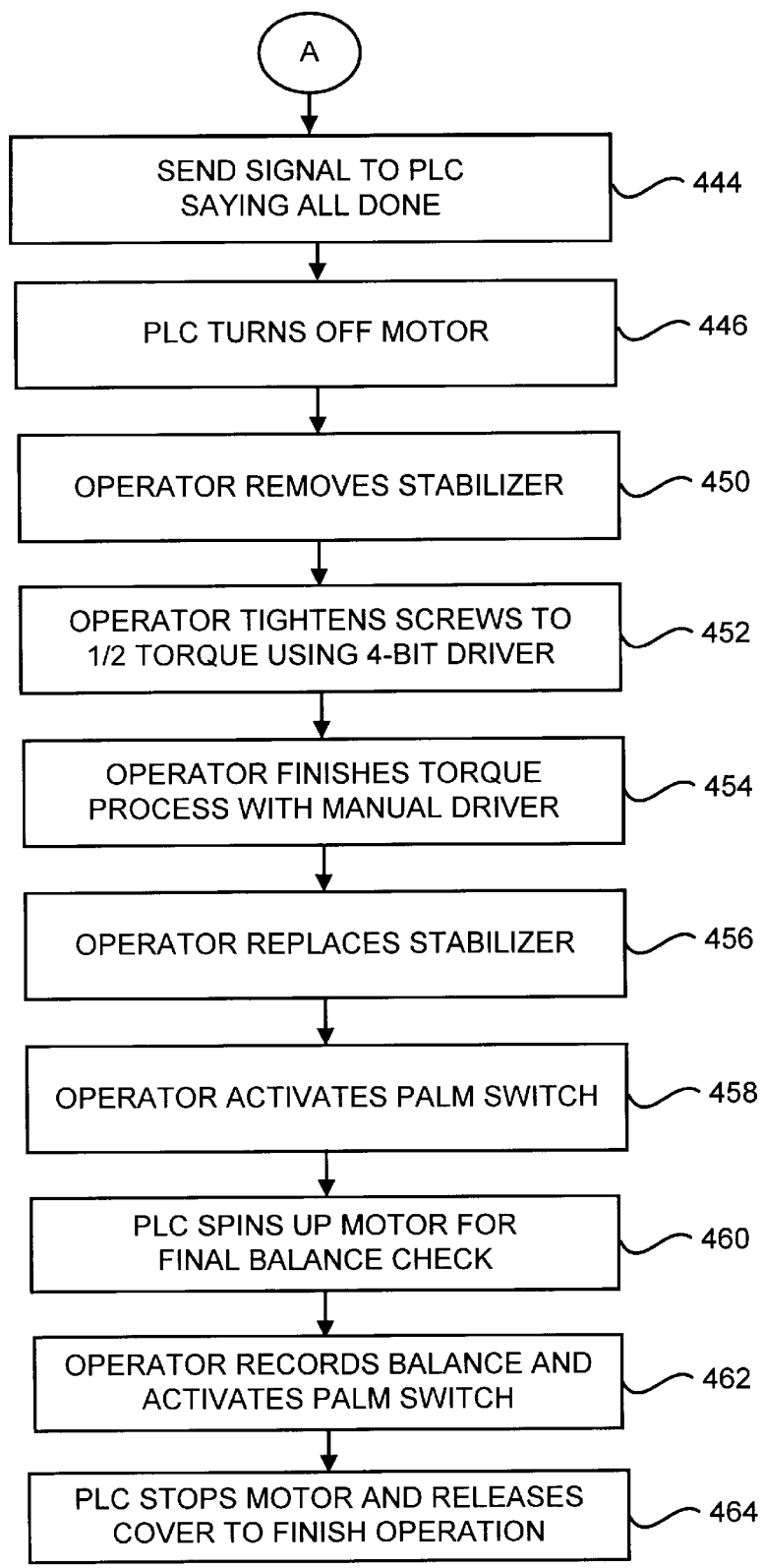
Figure 4C:
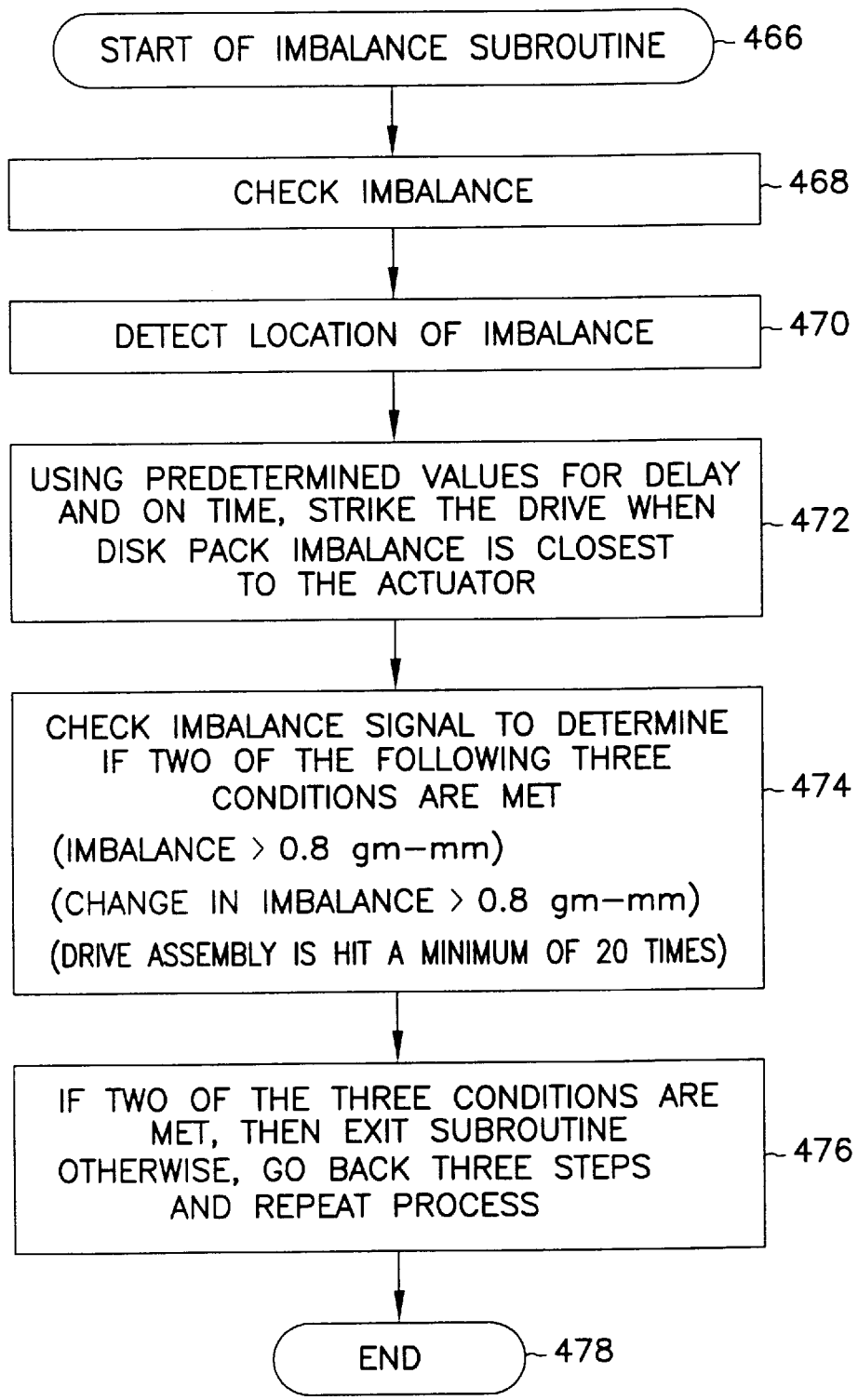

In the imbalance subroutine of FIG. 4C, which is entered at start 466, the current imbalance is detected or checked at 468, the location of the imbalance is detected at 470. Using predetermined values for delay based on the rotational velocity of the disks, hammer flight time, and difference in angles between the sensor and the solenoid, the base is struck with maximum momentum transferring force when the disk stack imbalance is calculated to be closest to the solenoid at 472. At 474, the imbalance signal is used to determine if any two of three conditions are met. The first two conditions are that the imbalance is greater than 0.8 gm-mm or if the change in imbalance was greater than 0.8 gm-mm. The third condition is that the drive assembly has been hit a minimum of 20 times. These values may of course be varied depending on the characteristics of the drive being balanced. If two of the three conditions are met at 476, the subroutine is exited at 478. If not, the steps are repeated starting at the detection of the location of imbalance at 470.

Figure 4D:
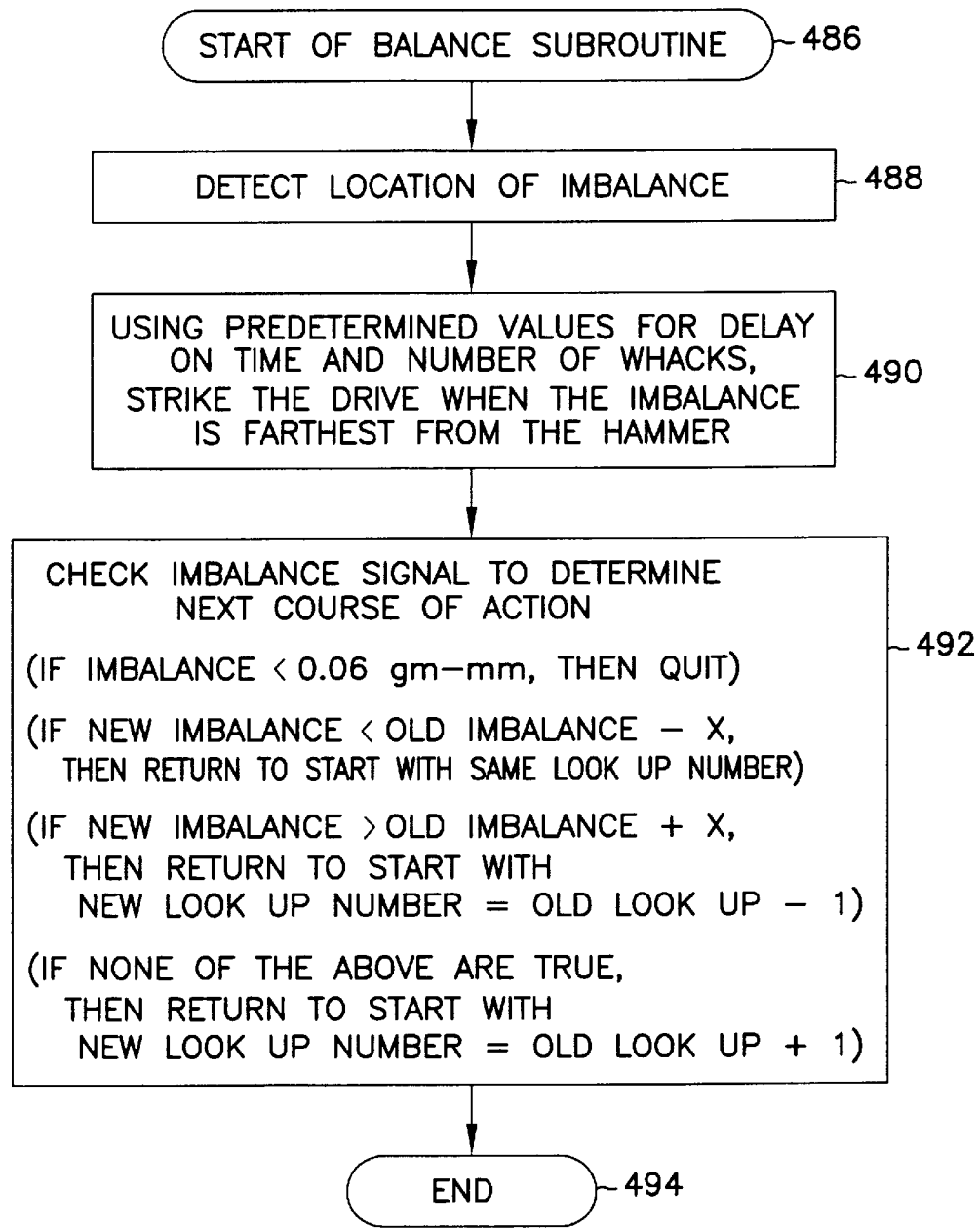

If two of the three conditions are met, the balance subroutine of FIG. 4D is entered at start block 486. The location of the imbalance is first detected at 488. Then, at 490, using predetermined values for delay, on time of the solenoid to drive the hammer, and number of strikes or whacks, the drive is struck by the hammer when the imbalance is farthest from the hammer. The predetermined values are stored in logical rows in a look up file. The on time values comprise a delay for turning on power to the solenoid to drive the hammer and how long to leave the power on. It is directly related to the momentum transferring force generated by the hammer which is calculated to provide selected G's on the order of 150, 125, 100, 75, 50 and 25. Each row of the look up file also indicates which edge to trigger off of from the velocity sensor signals, the number of whacks or strikes to provide when multiple whacks are to be performed, how long to delay between the multiple whacks, and how long to delay before reading the resulting imbalance at 492. Multiple whacks are initially used to retrieve the disk pack from the bias position. The actual values stored in the look up table are calculated based on simple experimentation. The values may vary significantly depending on the drive to be balanced.

If the resulting imbalance is less than 0.06 gm-mm, then the subroutine is ended at 494 and the drive is considered balanced. If the new imbalance is less than the old imbalance minus a constant, then this subroutine is started again with the same row of predetermined values. If the new imbalance is greater than the old imbalance plus a further constant which may be different if desired, then this subroutine is started again with values stored in a previous row of the look up table, which provides a smaller momentum transferring force. If none of the above are true, then the subroutine is started again with values stored in the next row of the look up table to obtain larger shifts of the disk pack. In this manner, decreasing momentum transferring forces are applied, and with repetitive strikes, the disk drive becomes balanced within the desired tolerance. Following full clamping of the disks, the resulting imbalance has been found to be in the range of 0.2 to near zero gm mm for one drive, which is an improvement over various prior methods on the order of a factor of 2 to 5 depending on the size of the drive.

The on time value is a function of detected hitting by the hammer, speed of rotation and detected imbalance in the disk drive. It may be varied between hits if measurements provided by either a sensor designed to detect the impact of the hammer or by measuring the change in phase of the imbalance following striking of the base. It is desirable to ensure that the striking is performed at the correct phase of the imbalance to provide optimal balancing.

Figure 5:
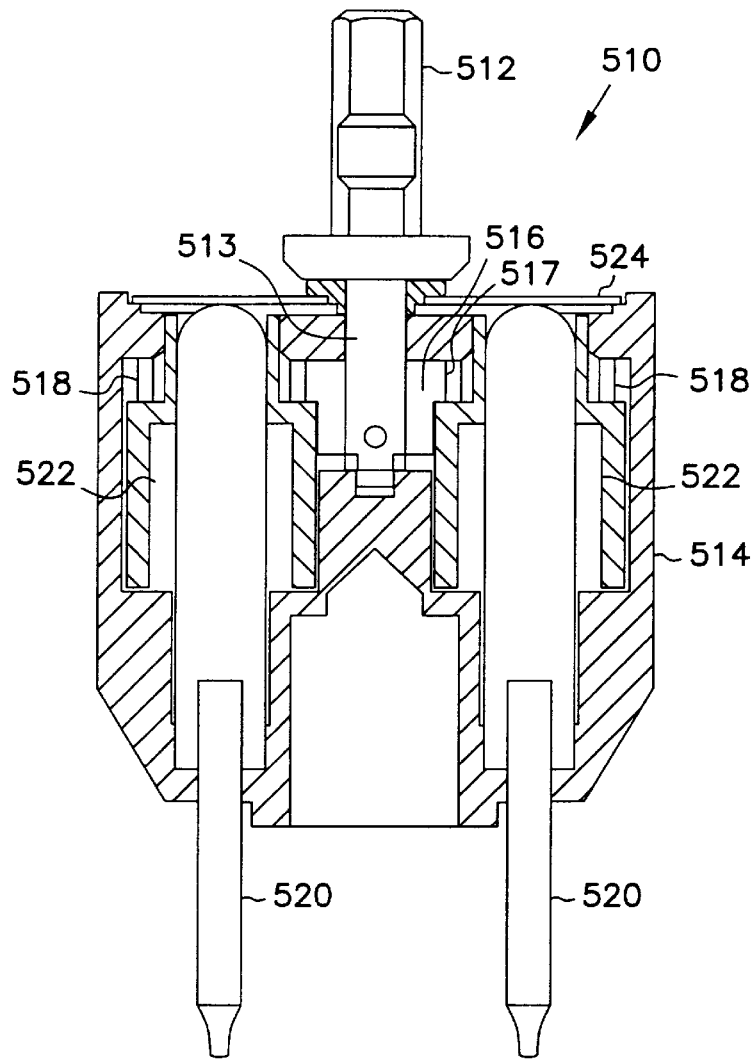
FIG. 5 is a cut away side view of a uniform rotation multi bit driver.

In one embodiment, a multi bit driver as shown generally at 510 in FIG. 5 is used to simultaneously rotate the screws through an equal angle of rotation. A hexagonal chuck 512 having a shaft 513 rotatably disposed at one end of a plastic body 514, which may be formed of the same type of material as the flex deck or any other suitable material. The chuck 512 ends in a central pinion 516 located inside of body 514. Central pinion 516 has a set of annular gears 517 suitably mating a plurality of pinion gears 518 for rotation thereof Each pinion gear 518 is further coupled to a driver bit 520 via a power takeoff in the form of a roller clutch 522. The driver bits 520 are spring loaded in the roller clutches 522 by means of a leaf spring 524 contacting rounded ends of the driver bits 520 to provide. It should be noted that the rounded ends of the driver bits 520 may freely rotate on the leaf springs 524 with minimal friction regardless of the force exerted by the leaf spring 524. The force exerted is just sufficient to allow the bits 520 to seat properly within screw heads without undue particle generation prior to seating. The roller clutches 522 ensure that each driver bit 520 turns with the pinion gears 518 in a direction which tightens the screws, usually clockwise. The roller clutches 522 also allow counterclockwise rotation until the bits 520 engage with heads of the screws in the hub, and thereafter the bits 520 slip in the clutches so as not to disturb the initial engaged screw positions.

Using the multi bit driver 510, a torque wrench is coupled via chuck 512. The bits are first rotated counterclockwise to engage them with the already lightly torqued screws. A clockwise rotation is then applied with a torque setting of approximately 4 inch-lbs. This setting will vary with different types of screws and drives in various embodiments. The assembly of gears ensures that each screw is driven through the same angle of rotation simultaneously to a given displacement and corresponding axial force. Since all screws started from the same plane, have the same thread pitch and are driven through the same angle of rotation against an element of common spring rate, the axial clamping force applied by each screw is essentially the same by definition regardless of the torque required to drive it. This reduces the potential radial shift which might be caused by trying to turn each screw with equal torque at the same time or in sequence. The torque required to drive each screw may not be directly related to the axial retentive force generated by the screw due to rotational frictional variations which may be caused by different oxidation of threaded portions or surface abnormalities. Only a single pass is required to secure the clamp to the hub, greatly reducing assembly time over methods requiring multiple passes. In addition, complex machinery and torque measurement devices may be replaced by a simple hand or automatically driven torque wrench.

In a further embodiment, when the multi bit driver 510 is inserted through the guide, the bits 520 are rotated counterclockwise to a first end stop position. The first end stop position is calculated to ensure that the bits 520 engage with the screws. The bits 520 are then rotated clockwise to drive the screws simultaneously to a second end stop. At this point, the screws have started from the same plane, are driven through the same angle of rotation and thus provide the same amount of axial retentive force. In both embodiments, the axial force applied by the screw for each instant of time during rotation of the screws is substantially equal such that radial shift is minimized at all times during tightening of the screws.

The disk pack is provided with an initial light clamping prior to the centering operation. A much lighter torque is required to permit the disk pack to shift when the base casting is subjected to impact from the solenoid hammer. It is however desirable to apply as much torque to the disk pack as possible while still permitting the shift to occur to prevent shift during further tightening steps. The larger the mass of the disk pack, the greater the momentum it has, and the more likely it is to shift when the base is subjected to a force designed to transfer momentum to the base. Ranges of torque that have been used vary from $\frac{1}{20}$th the final torque to $\frac{1}{2}$ the final torque for such larger mass disk packs. The multi bit driver is then used again, first to engage the screws equally as described above, then to rotate the screws clockwise following the conclusion of the balancing step to a desired torque and axial retentive force.

In further embodiments of balancing the disk drive, alternative clamping methods may be used to provide the initial light clamping of the disks. In one such embodiment, a weighted cap may be used during centering to hold the disks in place, and then removed to allow for the use of a common heat shrink clamp. Other methods of lightly and then permanently clamping the disk pack will be apparent to those skilled in the art. In further embodiments, no light clamping is used, and the disk pack is centered and then retentively clamped.

Figure 6:
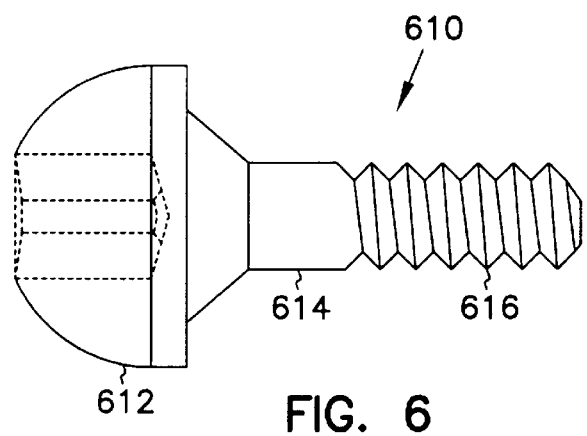
FIG. 6 is a side elevation view of a screw formed from a memory material.

While standard stainless steel screws, such as National Course (NC) 2-56 button headed cap screws having 56 threads per inch are used in the above embodiments, the tightening of them to fixedly secure the disk pack does have the potential of generating unwanted particles, since there are metal parts which rub each other during initial engagement of the bits with the screw heads and during rotation of the screws. In a further embodiment, screws formed of a memory alloy are used as shown generally at 610 in one example in FIG. 6. The memory alloy in one embodiment is Flexinol™ provided by Dynalog. Nickel-Titanium alloys are generally used to form memory alloys as is commonly known. Memory alloys have the characteristic that they may be pulled in a cool state, and remain elongated. When heated to a transformation temperature, the crystalline structure changes from face cubic to body cubic, causing the alloy to shrink back to its original state, changing volume in a single dimension.

Screw 610 comprises a head 612 having a shank 614 which is unthreaded, and corresponds to at least the height of the clamp 50 through which it will pass through to the hub, where a threaded portion 616 of the screw 610 will be engaged with a suitably mating threaded portion to a desired light torque. In one embodiment, axially prestretched screws 610 are tightened via a driver to provide a desired axial force during the balancing of the disk stack. It may also be used with other balancing methods. Once ready for fixed attachment of the disk pack, each screw 610 is substantially simultaneously, or as otherwise desired, heated to its transformation temperature as by heated contact elements or lasers focused on each head 612 causing the screw 610 to shrink in the axial direction and provide desired axial retentive force. If heated substantially simultaneously, the same benefits are obtained as described above with respect to simultaneous tightening of normal screws. In addition, since little if any force by a hard material such as a bit is applied to the screw 610, there is less chance of particle generation.

The transformation temperature is much higher than that of the normal operating temperature of the disk drive, and can provide a shrinkage of up to approximately 7% if desired depending on how far the screw was stretched.

In one embodiment, rod stock memory alloy of sufficient diameter (0.160 inches for example) to machine a number 2 screw is first axially stretched approximately 5% in length. Approximately 300 pounds of force is required to stretch a 0.160 inch diameter of alloy. The actual length it is stretched and diameter of the resulting screw will be a function of the desired axial retentive force which is sufficient to prevent movement of the disk pack during operation, but not so much as to undesirably warp the disk pack. The force required to stretch the alloy, and hence the maximum clamping force it can provide at normal disk drive operating temperatures is a function of the diameter of the screw. The screw is then machined in a common manner to have approximately the same thread pitch crest and root as a standard screw previously used. When the screw is then heated following installation in the clamp and hub, it contracts or shrinks along its entire axial length to about a 4% stretched state. This results in the thread pitch increasing to about 59 threads per inch. In addition to providing a desired axial retentive force, a self locking thread pitch is also provided. In other words, the threads tend to squeeze against the matingly threaded portion of the hub, thus locking the screw in place. In a further embodiment, only the shaft of the screw is stretched following machining of the screw from alloy stock. This resulting stretched screw also has the same dimensions as that of a standard screw. When heated to the transformation temperature, the shaft will shrink a desired amount. Less heat needs to be provided as by silver tipped contact heating elements or other heating elements including radiation type heating devices such as lasers, and the screw may be removed for rework much more easily than the self locking version of the screw.

An alternative method for centering the disk pack 47 is shown in the flow diagrams of FIGS. 7A–7G. In the alternative embodiment, with reference to FIGS. 1 and 7A, following start at 700, an operator (not shown) performs an operator set-up 702. The operator set-up 702 includes first lightly coupling the disk pack 47 to the motor hub (not shown) via the clamp 50. The base 32 is then placed in the flex deck 30. The cover 70 is closed and the controller 44 activated. The controller 44, in turn, secures the base 32 to the flex deck 30 via the vacuum pump 39. The controller 44 then initializes rotation of the spindle motor (not shown), causing the hub and thus the disk pack 47 to rotate.

Following proper setup, a uniform imbalance routine is performed at step 706 to generate a uniform imbalance in the disk pack 47. One suitable example of a uniform imbalance routine is described in greater detail below with reference to FIG. 7B. A balance routine is then performed at 708 to balance the disk pack 47. One suitable example of a balance routine is described elsewhere with reference to FIGS. 7C1–7C2. The controller 44 then deactivates the motor at 710. The operator then opens the cover 70 and tightens the screws of the clamp 50 at 712. To ensure that a proper disk pack balance was achieved, and that the screws were sufficiently secured, a final balance and tightening confirmation routine is performed at 714. One suitable example of a final balance and tightening confirmation routine is provided elsewhere with reference to FIGS. 7F1–7F2. Assuming that the disk pack 47 is properly balanced and secured to the hub, the controller 44 then stops the motor at 716 and releases the cover 70 to complete the balancing operation at 718.

Figure 7A:
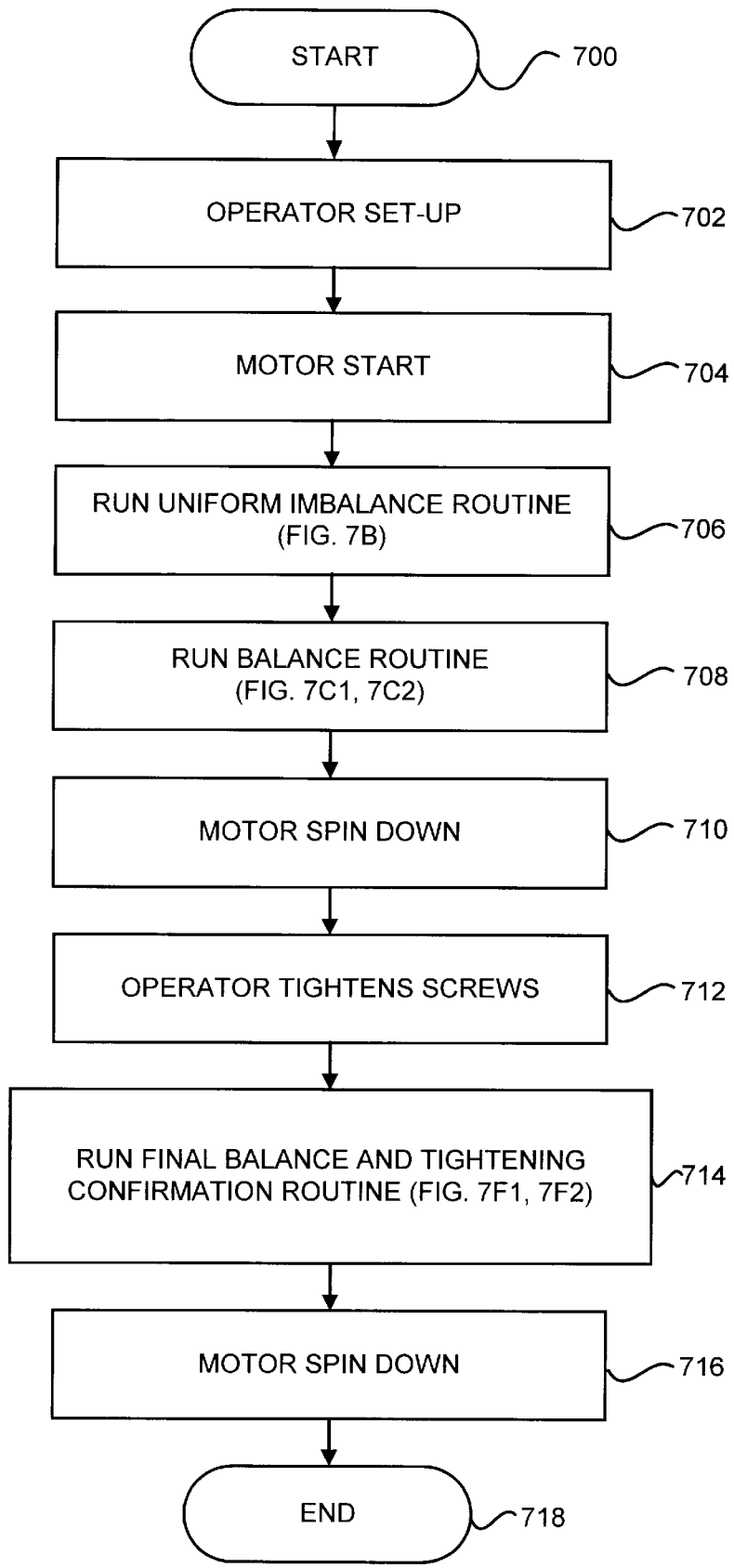
Figure 7B:
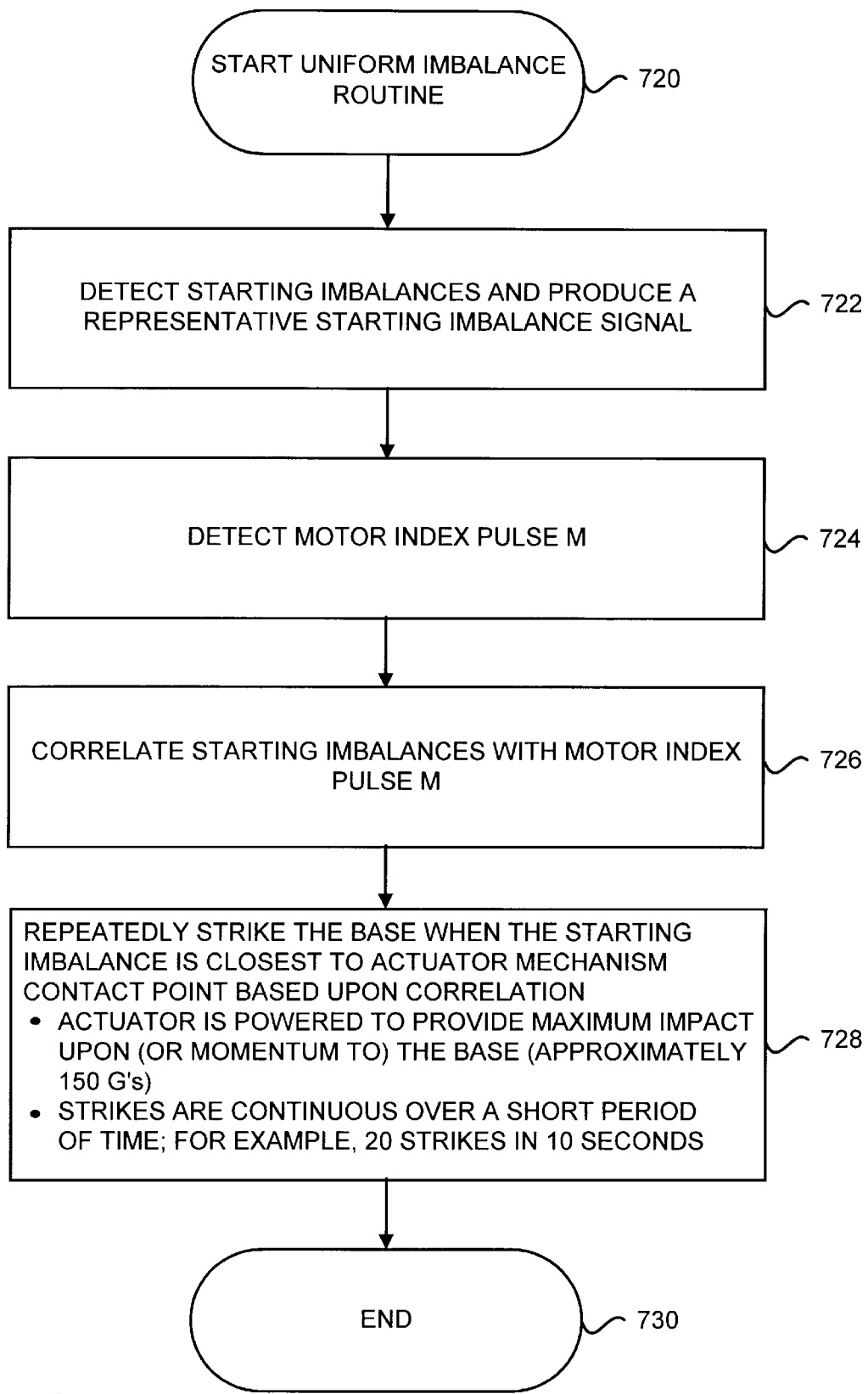
Figure 7E:
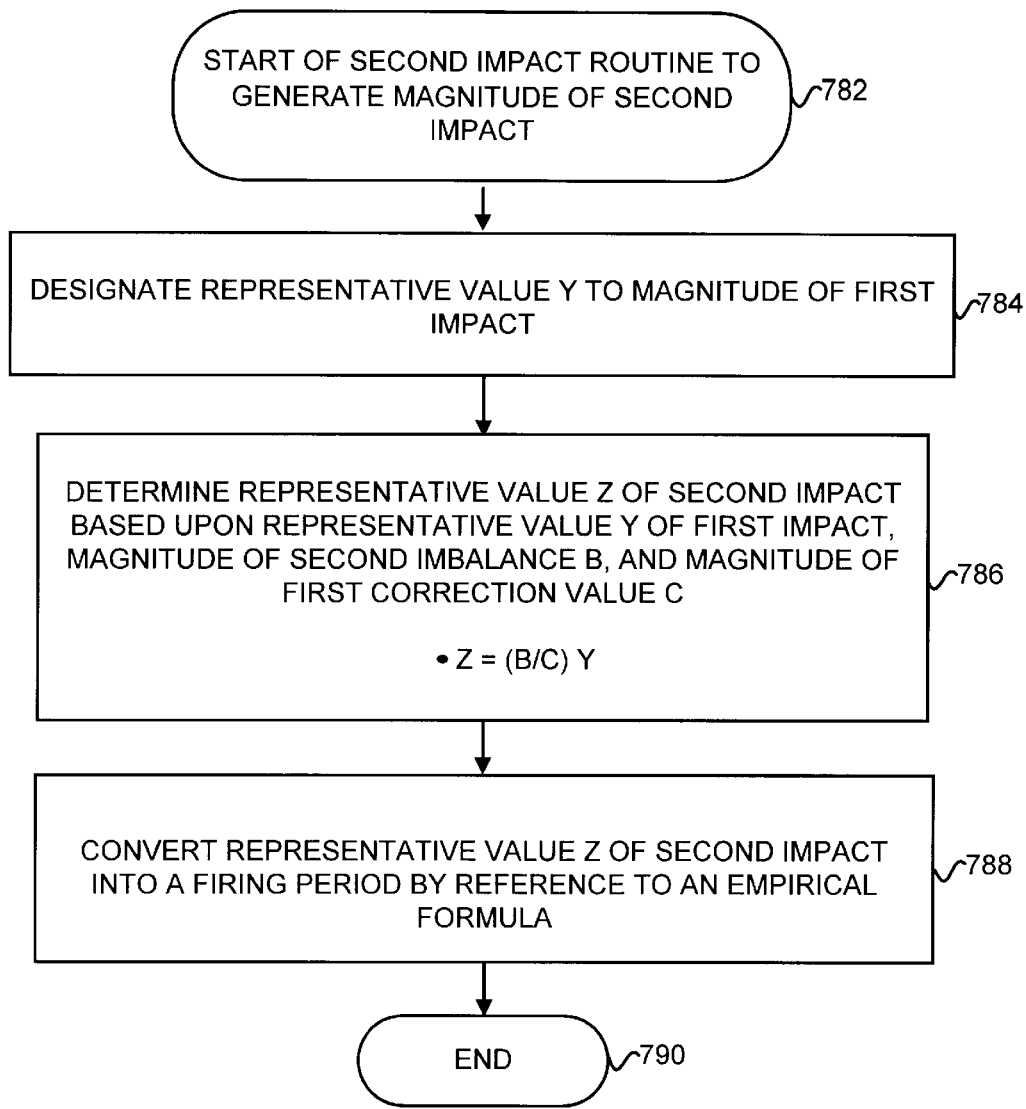
Figure 7G:
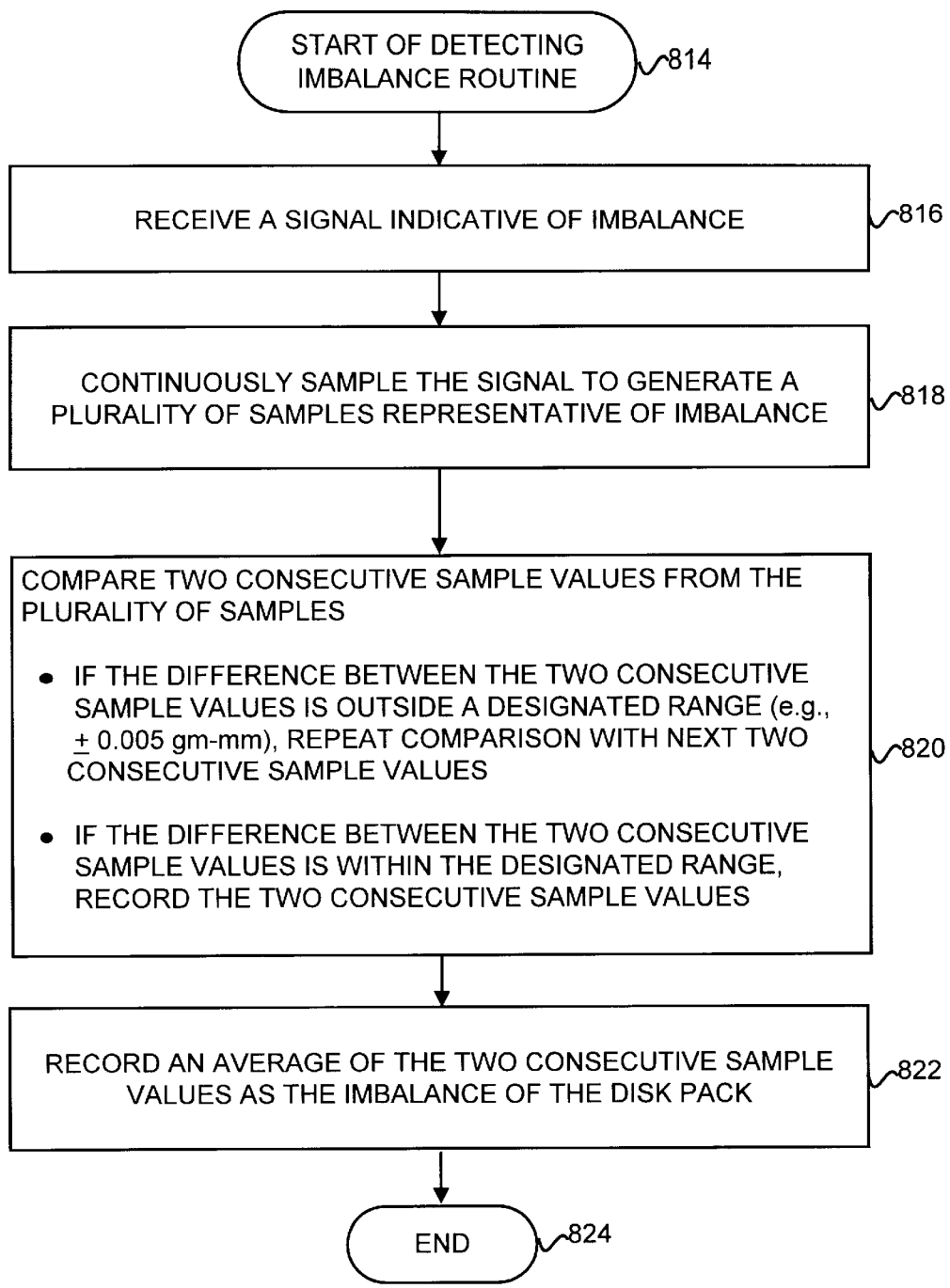
Figure 8A:
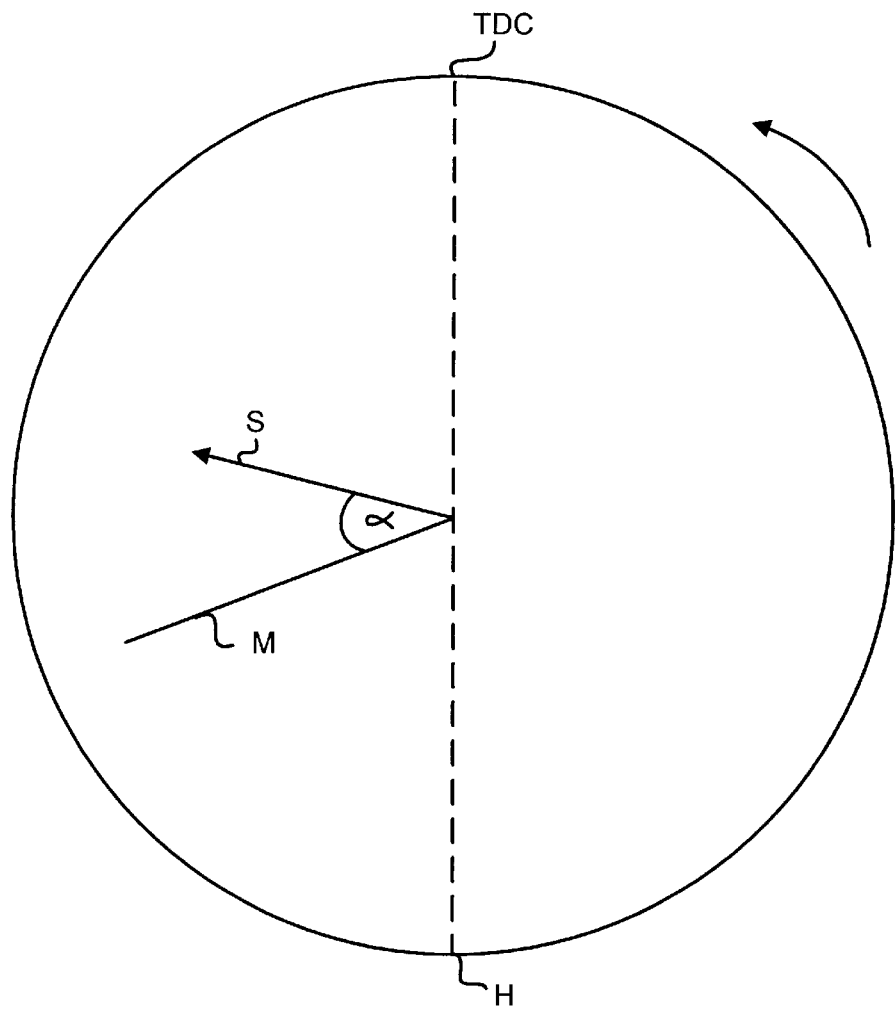
FIGS. 8A–8C are phase diagrams illustrating examples of the alternative method of FIGS. 7A–7G.
Figure 8B:
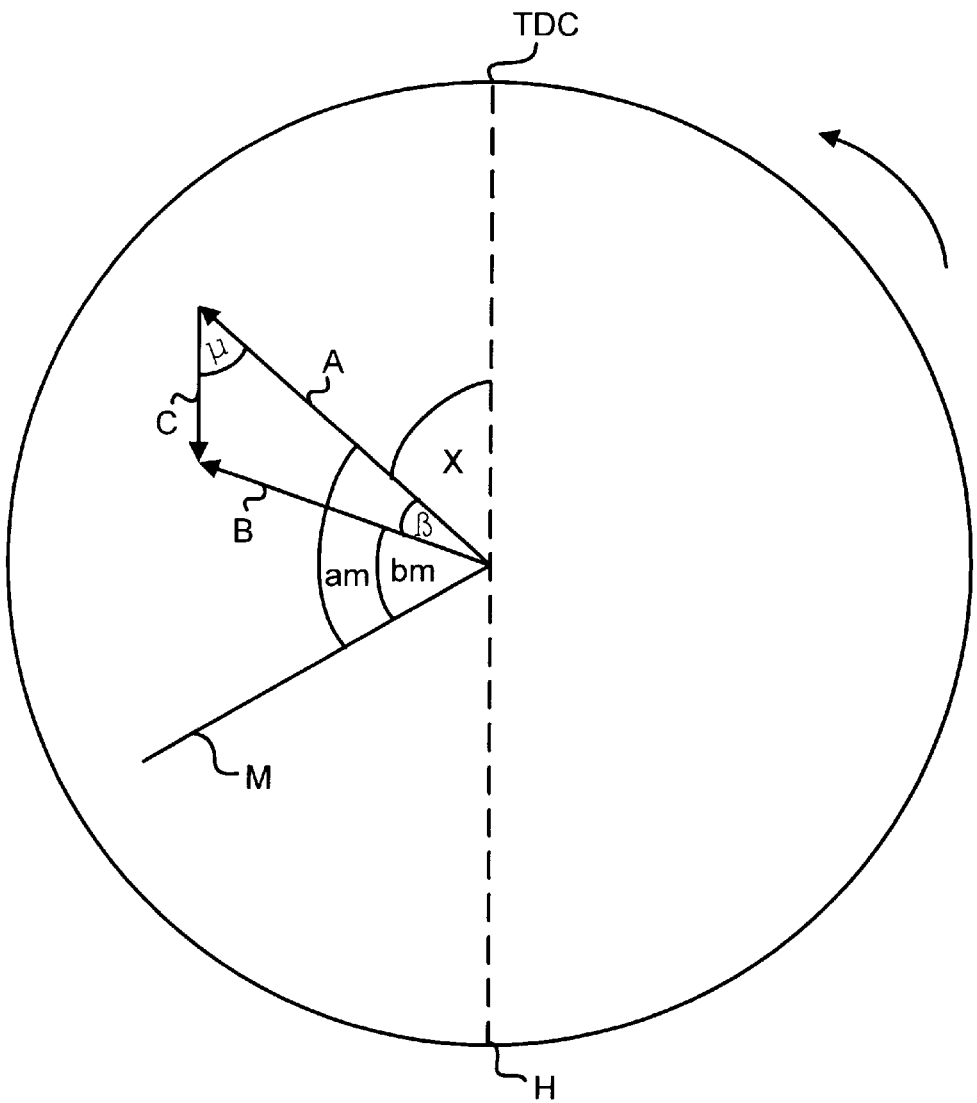
Figure 8C:
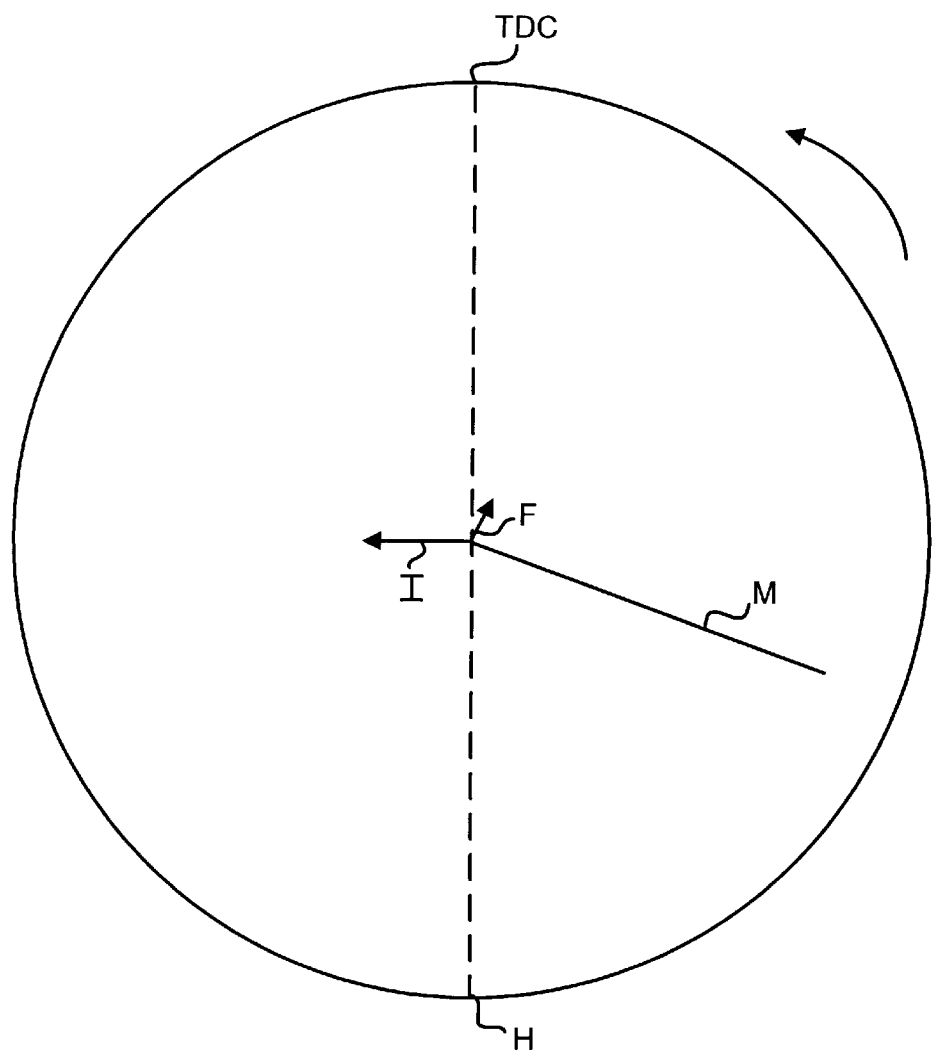

Details on the various steps described above are provided in the remaining flow diagrams (FIGS. 7B–7G), as well as in the phase diagram examples of FIGS. 8A–8C. For example, FIG. 7B describes one example of the uniform imbalance routine (step 706 in FIG. 7A), displayed graphically in FIG. 8A. For purposes of illustration, FIG. 8A depicts a phase diagram of the disk pack 47 rotating counterclockwise (shown by an arrow in FIG. 8A). FIG. 8A (and other phase diagrams described elsewhere) also includes a point of contact H and a top-dead-center point TDC. The point of contact H represents a point of the disk pack 47 closest to the area at which the hammer 15 contacts or "hits" the base 32. Conversely, TDC represents a point of the disk pack 47 directly opposite the point of contact H (or furthest away from the area at which the hammer 15 contacts the base 32). The importance of these two reference points will become more clear below. In general terms, however, when the disk pack 47 is rotating, the point of contact H and TDC do not move, and thus can be considered as "known" locations. Thus, it is possible, at any instant in time, to reference a particular point on the disk pack 47 relative to the point of contact H or to TDC.

With reference to FIGS. 1, 7B and 8A, then, the uniform imbalance routine starts at 720. The goal of the uniform imbalance routine is to arrange the disk pack 47 such that the disks have a uniform imbalance. While the disk pack 47 is rotating, a starting imbalance S in the disk pack 47 is detected at 722. In this regard, the sensor 41 produces a signal representative of the starting imbalance S to the controller 44. Notably, the starting imbalance S is essentially an average of the randomly imbalanced disks comprising the disk pack 47. As shown in the example of FIG. 8A, the starting imbalance S can be represented by a vector having a magnitude and direction relative to a center of the disk pack 47. The controller 44 produces and stores a starting imbalance signal representative of the starting imbalance S magnitude and direction.

The controller 44 then detects a motor index pulse M at 724. The motor index pulse M is generated by the spindle motor otherwise rotating the hub, and thus the disk pack 47. More particularly, once the motor has been initiated, the motor provides a pulse signal after each revolution. Because the disk pack 47 is secured to the motor, the motor index pulse M has a fixed relationship relative to rotation of the disk pack 47. In other words, during each revolution, the motor index pulse M is generated at precisely the same rotational point of the disk pack 47. Further, as shown graphically in the example of FIG. 8A, the motor index pulse M is generated at a known rotational distance from the point of contact H and TDC during each revolution of the disk pack 47. Because the point of contact H is known, the controller 44 is able to formulate a position of the motor index pulse M relative to the point of contact H at any instant in time.

The starting imbalance S is then correlated with the motor index pulse M at 726. More particularly, the controller 44 compares the starting imbalance signal with the motor index pulse M to determine the rotational position or relationship of the starting imbalance S relative to the motor index pulse M. Suitably, the correlation of the starting imbalance S with the motor index pulse M can be expressed as an angular difference, shown as the angle "alpha" in FIG. 8A. Because the motor is rotating at a constant speed, the phase of the motor, or the motor index pulse M, is fixed relative to the starting imbalance S. Therefore, the angle "alpha" is also fixed.

With the above correlation in mind, at step 728 the controller 44 causes the hammer 15 to repeatedly strike the base 32. In this regard, the controller 44 causes the hammer 15 to strike the base 32 when the starting imbalance S is closest to the point of contact H. Once again, the disk pack 47 is continually rotating at a constant, known speed. At a certain time during each revolution, the starting imbalance S will be closest to the point of contact H. Because the motor index pulse M is consistently generated at the same point during each revolution, the controller 44 knows the location of the motor index pulse M relative to the point of contact H during each revolution. Further, the controller 44 has correlated the starting imbalance S with the motor index pulse M. As a result of this correlation, then, the controller 44 also "knows" the location of the starting imbalance S relative to the point of contact H. With respect to the example depicted in FIG. 8A, it may be determined that the starting imbalance S is behind the motor index pulse M, such that "alpha"=15 degrees. It should be understood that the term "behind" is in reference to a counterclockwise rotation of the disk pack 47. With this angular difference in mind, the controller 44 will cause the hammer 15 to strike the base 32 when the disk pack 47 has rotated to a point whereby the motor index pulse M has rotated past the point of contact H by 15 degrees. At this point, the starting imbalance S is approximately closest to the point of contact H.

The controller 44 directs the solenoid 14 so that a maximum impact is imparted by the hammer 15 to the base 32, on the order of approximately 150G's. Each impact of the hammer 15 on the base 32 transfers sufficient momentum to the base 32 to cause the base 32 to shift relative to the disk pack 47. More particularly, the disk pack 47 remains stationary while the base shifts. It is important to recognize, however, that imbalance of the disk pack 47, such as the starting imbalance S, is with reference to a centricity of the disk pack 47 relative to the hub. Thus, movement of the base relative to the disk pack 47 results in a change or movement of the imbalance.

The hammer 15 may be caused to strike the base 32 about twenty times over an approximately ten-second time period. Once again, each strike occurs when the starting imbalance S is proximate the point of contact H, based upon the previously described correlation of the starting imbalance S with the motor index pulse M. The base will shift relative to the disk pack 47, moving the starting imbalance S radially away from a center of the disk pack, or toward the point of contact H. More particularly, the base will move relative to each of the individual disks comprising the disk pack 47. Following the repeated, large magnitude impacts, the various disks will shift such that each disk approximately contacts the hub along an inner diameter of the disks. As a result, a uniform imbalance is generated in the disk pack 47. Following the repeated strikes over a short period of time, the uniform imbalance routine is ended at 730.

One example of the balance routine (step 708 of FIG. 7A) is shown as starting at 732 in FIG. 7C1. For purposes of illustration, reference is also made to the phase diagram example of FIG. 8B, which depicts graphically the steps of the balance routine, as well as FIG. 1. Similar to FIG. 8A, FIG. 8B provides a block representation of the disk pack 47 rotating counter clockwise. The point of contact H and TDC are also shown. With the above background in mind, the balance routine starts with the disk pack 47 rotating. A first imbalance A is detected in the disk pack 47 at step 734. A suitable imbalance detection routine for detecting the first imbalance A is described elsewhere. FIG. 8B depicts one example of the first imbalance A on the rotating disk pack 47 in vector form, such that the first imbalance A has a direction (relative to a center of the disk pack 47) and a magnitude. The controller 44 produces and stores a first imbalance signal indicative of the direction and magnitude of the first imbalance A.

The controller 44 then detects a motor index pulse M at 736. As previously described, the motor index pulse M is generated by the spindle motor (not shown), otherwise rotating the disk pack 47, once during each revolution. Thus, as shown in FIG. 8B, the motor index pulse M is recognized by the controller 44 at the same point during each revolution of the disk pack 47. For example, with reference to FIG. 8B, the motor index pulse M occurs each time the disk pack 47 has rotated approximately 120 degrees past TDC. The controller 44 continuously receives and stores the motor index pulse M.

At step 738, the controller 44 correlates the first imbalance A with the motor index pulse M. This correlation is based upon the previously stored first imbalance signal and the motor index pulse M. Based upon the correlation, the controller 44 determines a first correlation value am. The first correlation value am is indicative of a position of the first imbalance A relative to rotation of the spindle motor. With reference to FIG. 8B, the first correlation value am may designate an angular difference between the direction of the first imbalance A and the motor index pulse M. Because the motor index pulse M is generated by the spindle motor at exactly the same rotational position during each revolution of the disk pack 47, and the first imbalance A does not change with each revolution, the first correlation value am remains constant. As a result, the controller 44 will, with reference to the motor index pulse M and the first correlation value am, know the location of the first imbalance during each revolution of the disk pack 47. In the example shown in FIG. 8B, the first correlation value am is 95 degrees. Thus, the first correlation value am designates that the direction of the first imbalance A is 95 degrees behind the motor index M (assuming counterclockwise rotation of the disk pack 47).

The controller 44 then directs the solenoid 14 to apply a first impact to the base 32 via the hammer 15 at step 740. In this regard, the hammer 15 contacts the base 32 proximate the point of contact H, shown in FIG. 8B. The first impact will cause the base 32, and thus the hub (not shown) of the spindle motor, to move toward TDC. The disk pack 47, otherwise loosely coupled to the hub, does not move. Thus, since the first imbalance A is a directly related to centricity (or lack thereof) of the disk pack 47 relative to the hub, movement of the hub while the disk pack 47 remains stationary results in a change in, or movement of, imbalance of the disk pack 47. To "correct" disk pack imbalance (or to "balance" the disk pack 47) means moving the first imbalance A as closely as possible to a center of the disk pack 47. With this in mind, the first impact is preferably applied, via a timing signal generated by the controller 44, when the first imbalance A is directly opposite the point of contact H, or at TDC. The base will move in the direction of TDC and therefore toward the first imbalance A, thereby reducing the disk pack 47 imbalance.

The controller 44 achieves proper timing of the first impact by reference to the first correlation value am. Once again, the first correlation value am is representative of a relationship between the motor index pulse M and the first imbalance A. With reference to the example shown in FIG. 8B, the controller 44 will attempt to apply the first impact when the disk pack 47 has rotated to a point such that the motor index pulse M is 95 degrees beyond TDC. At this point, the first imbalance A should be at TDC, or opposite the point of contact H.

The magnitude of the first impact is suitably the maximum impact the solenoid 14 is able to deliver via the hammer 15. For example, the first impact may be on the order of approximately 150 G's.

Following application of the first impact, the imbalance of the disk pack 47 will move from the first imbalance A to a second imbalance B. The second imbalance B in the disk pack 47 is detected at step 742. The second imbalance B is shown as a vector in FIG. 8B, having a magnitude and direction. The controller 44 stores a second imbalance signal indicative of the direction and magnitude of the second imbalance B.

At step 744, the controller 44 determines if the second imbalance B is within a tolerance range specification. One suitable tolerance range is 0.1 gm-mm. If the controller 44 determines that the second imbalance B is less than or equal to 0.1 gm-mm, the disk pack 47 is deemed to be balanced and the balance routine is ended. If, however, the second imbalance B has a magnitude greater than 0.1 gm-mm, further balancing of the disk pack 47 is required.

Assuming that the second imbalance B is greater than 0.1 gm-mm, the controller 44 must determine the magnitude and timing of a second impact. The first step in this process is shown at 746 whereby the controller 44 correlates the second imbalance B with the motor index pulse M. More particularly, the second imbalance signal is correlated with the motor index pulse M to produce a second correlation value bm, which is stored by the controller 44. Similar to the first correlation value am, the second correlation value bm is indicative of a position of the second imbalance B relative to rotation of the motor. Thus, the second correlation value bm can be expressed in terms of an angular difference between the motor index pulse M and the second imbalance B. In the example shown in FIG. 8B, the second correlation value bm is 50 degrees.

Theoretically speaking, the second correlation value bm should be identical to the first correlation value am. In other words, if the first impact was applied when the first imbalance A was directly opposite the point of contact H (or at TDC), the disk pack 47 imbalance would move along the TDC line, and thus would not encounter an angular change relative to the motor index pulse M. However, while every effort is made in step 740 to ensure that the first impact was applied when the first imbalance A was directly opposite the point of contact H (or at TDC), due to the high rotational speed of the disk pack 47, along with other inherent variables, oftentimes the first impact will have been applied slightly before or after the first imbalance A had rotated to TDC. As a result, the second imbalance B will have a varying angular position relative to the motor index pulse M. With respect to the example of FIG. 8B, the first impact was applied when the disk pack 47 had rotated to a point whereby the first imbalance A was slightly past TDC. Thus, the second correlation value bm is slightly less than the first correlation value am.

In light of the above-described potential for slight error in timing of the first impact, the controller 44 suitably performs a separate timing compensation routine before applying a second impact. For example, as shown at step 748, the controller 44 runs a phase compensation value determination routine. The purpose of the phase compensation value determination routine is to quantify the slight timing error of the first impact. The controller 44 then uses the phase compensation value when determining the timing of the second impact. Effectively then, the phase compensation value compensates or corrects for the slight timing error inherent within the controller 44. Details on one example of a phase compensation value determination routine are provided elsewhere with reference to FIGS. 7D1–7D2. In general terms, however, the phase compensation value is based upon a difference between a desired position of the first imbalance A when the first impact was applied (i.e., at TDC) and an actual position of the first imbalance A when the first impact was applied. This difference is referred to as a phase difference value X and, as shown in FIG. 8B, can be expressed in terms of an angle.

One suitable component in determining the phase difference value X, and thus the phase compensation value, is a correction value C. As shown graphically in the example or FIG. 8B, the correction value C is an amount of change between the first imbalance A and the second imbalance B, and can be represented by a vector. Details on how the controller 44 ascertains the correction value C are provided elsewhere. With the correction value C in mind, however, the controller 44 determines if an "overcorrection" has occurred at step 750. Overcorrection is understood to refer to a situation in which the first impact (or any other subsequent impact) "moved" the first imbalance A (or subsequent imbalance) to an opposite side of the disk pack 47. In other words, overcorrection occurs when the magnitude of a respective impact is too large relative to a magnitude of a particular imbalance. For example, with reference to FIG. 8B, if the second imbalance B were to have been located at an opposite side of the center of the disk pack 47 (relative to a location of the first imbalance A), the magnitude of the first impact would have been too large, resulting in overcorrection. The controller 44 analyzes for overcorrection by comparing a magnitude of the correction value C with a magnitude of the first imbalance A (via the first imbalance signal). If the correction value C has a greater magnitude than the first imbalance A, then overcorrection has occurred. With reference to the specific example shown in FIG. 8B, the correction value C has a magnitude less than that of the first imbalance A. As such, the first impact did not result in overcorrection.

At step 752, the controller 44 determines an appropriate magnitude of a second impact. One suitable method for determining a magnitude of the second impact is described elsewhere, with reference to FIG. 7E. In basic terms, it can be assumed that the second imbalance B is "closer" to a center of the disk pack 47 (or the hub) than the first imbalance A as a result of the first impact. Consequently, it may be that the magnitude of the second impact need not be as large as the magnitude of the first impact. The determination of second impact magnitude routine ascertains an appropriate value for the second impact, based, in part, upon the magnitude of the first impact and the resulting change in position of the disk pack 47 imbalance.

After determining a suitable magnitude for the second impact, the controller 44 applies the second impact at step 754. As with the first impact, the controller 44 dictates timing of the second impact to a point whereby the second imbalance B is approximately opposite the point of contact H (or at TDC). Similar to timing of the first impact, the controller 44 estimates rotational positioning of the second imbalance B with reference to the second correlation value bm. The second correlation value bm is representative of a difference between the motor index pulse M and a radial direction of the second imbalance B. Thus, if the second correlation value bm indicates that the second imbalance B is 40 degrees "behind" the motor index pulse M, the controller 44 will time the second impact such that it occurs when the motor index pulse M is 40 degrees past TDC. Additionally, when determining timing of the second impact, the controller 44 references the previously determined phase compensation value. The phase compensation value indicates that the internal timing calculation of the controller is slightly incorrect. If the controller 44 were to only reference the internal timing calculation (based solely upon the second correlation value bm), timing of the second impact would again be slightly off, such that resulting movement of the second imbalance B would not be directly toward a center of the disk pack 47 (or along the direction of the second imbalance B vector shown in FIG. 8B). Instead, the disk pack 47 imbalance may move only slightly closer to the center of the disk pack 47, to a different vector direction. Assuming this process were repeated several times, the slight impact timing error of the controller 44 might prevent the disk pack 47 from ever being balanced, or at least will increase the time required to achieve balance. To avoid this problem, the controller 44 adjusts the internal timing calculation with reference to the phase compensation value. For example, with reference to FIG. 8B, if the phase difference X were to indicate that the first impact was 15 degrees "late," the phase compensation value would adjust the timing of the second impact so as to occur at a rotational position approximately 15 degrees earlier than otherwise calculated by the controller 44 with reference to the second correction value bm.

Following application of the second impact, the controller 44 detects a third imbalance (not shown in FIG. 8B) at 756. The controller 44 determines if the third imbalance is within an imbalance tolerance range specification (such as 0.1 gm-mm) at 758. If the third imbalance is within the tolerance range, the disk pack 47 is deemed to be "balanced," and the balancing routine is ended. If, however, the third imbalance is not within an accepted tolerance range, a third impact must be applied. Magnitude and timing of the third impact is determined by the controller 44 with reference to the previously described steps, including compensating for controller timing error as well as determining an appropriate impact magnitude. This process is repeated until the disk pack 47 is "balanced," at which point the balance routine is ended at step 760.

The phase compensation value determination routine (step 748 in FIG. 7C2) is described in greater detail in FIGS. 7D1–7D2. For ease of illustration, reference is also made to FIG. 8B. As previously described, the phase compensation value is based upon a difference between a desired positioning of the first imbalance A (or subsequent imbalance) at the time of the first impact (or subsequent, related impact) and an actual positioning of the first imbalance A at the time of the first impact. In one suitable embodiment, this difference is referred to as the phase difference X and is expressed in terms of an angle.

The phase compensation value determination routine begins at 762. The first correlation value am, indicative of an angular difference between a direction of the first imbalance A and the motor index pulse M, is then determined at 764. For example, the controller 44 will compare the previously stored first imbalance signal with the motor index pulse M to arrive at the first correlation value am. An example of the first correlation value am is depicted graphically in FIG. 8B.

The second correlation value bm, indicative of an angular difference between a direction of the second imbalance B and the motor index pulse M, is then determined at step 766. For example, the controller 44 will compare the previously stored second imbalance signal with the motor index pulse M to arrive at the second correlation value bm. An example of the second correlation value bm is depicted graphically in FIG. 8B.

At step 768, the angular difference between the directions of the first imbalance A and the second imbalance B is determined. This angular difference is depicted in FIG. 8B as the angle $\beta$. Suitably, the angle $\beta$ is equal to the difference between the first correlation value am and the second correlation value bm (i.e., $\beta$=am−bm).

The magnitude of the correction value C is then determined, at step 770. As previously described, the correction value C is representative of the amount of change between the first imbalance A and the second imbalance B. The correction value C can suitably be determined through the trigonometric relationship of the first imbalance A, the second imbalance B and the angle $\beta$ between the first and second imbalances. For example, the magnitude of the correction value C can be determined according to the law of cosine (i.e., $C^2 = A^2 + B^2 - 2AB\cos\beta$).

At step 772, an angular difference between a direction of the first imbalance A and the correction value C is determined. This angular difference is represented by the symbol "μ" in FIG. 8B. Determination of μ is based upon the trigonometric relationship of the correction value C, the angle β between the first and second imbalances, and the magnitude of the second imbalance B. For example, μ can be determined according to the law of sine (i.e., $\mu=B(\sin\beta/C)$).

At step 774, the phase difference X between the direction of the first imbalance A and TDC is determined. Stated another way and with reference to FIG. 8B, the phase difference X represents the difference or error between the desired timing of the first impact, and the actual timing of the first impact. Once again, during the previously described balancing routine, the desired timing of the first impact is when the first imbalance A is at a rotational position directly opposite the point of contact H (or at TDC). If, for example, the first impact occurred when the first imbalance A was at TDC, the second imbalance B would be along the radial direction of the first imbalance A. In this case, the phase difference X would be zero. In the example shown in FIG. 8B, however, the first impact was slightly "late," such that the second imbalance B is not along the radial direction of the first imbalance A. Importantly, however, movement of the disk pack 47 imbalance from the first imbalance A to the second imbalance B (or the direction of the correction value C vector) is parallel with a line between the center of the disk pack 47 and TDC. Due to this parallel relationship, the phase difference X between the direction of the first imbalance A and TDC at the time the first impact was applied is equal to the angle μ between the first imbalance A and the correction value C. Thus, X=μ.

The controller 44 then determines whether the first impact (or subsequent impacts) was "early" or "late" at step 776. With reference to the counterclockwise rotation of the disk pack 47 shown in FIG. 8B, an impact is "early" when it occurs slightly before the first imbalance A (or subsequent imbalance) has rotated to TDC. Conversely, an impact is "late" when it occurs slightly after the first imbalance A has rotated past TDC. In the example shown in FIG. 8B, the first impact occurred slightly after the first imbalance A passed TDC, and therefore was "late." The controller 44 makes this determination by comparing the first correlation value am with the second correlation value bm. If the first correlation value am is greater than the second correlation value bm, then the first impact was late. Alternatively, if the first correlation value am is less than the second correlation value bm, then the first impact was early. Thus, in the example of FIG. 8B, the first correlation value am is greater than the second correlation value bm, such that the controller 44 would determine that the first impact was late.

Finally, with the above information in hand, the controller 44, at step 778, determines the phase compensation value for timing of the second impact (or subsequent impacts). The phase compensation value is based upon the previously determined phase difference X and whether the first impact was early or late. In one suitable embodiment, the phase compensation value is determined by first converting the phase difference X into an arc length distance. The arc length distance is then converted into a time value T based upon the known rotational speed of the disk pack 47. Thus, the time value T represents the difference, in units of time, between the desired timing of the first impact and the actual timing of the first impact. The time value T is divided by 2 to account for possible error in calculation of the time value T. Finally, the time value T divided by 2 (or T/2) is assigned a positive or minus sign, based upon the determination of whether the first impact was early or late. For example, if the first impact was late, T/2 is assigned a negative sign. This final value is the phase compensation value, which is then used during the previously described balance routine to achieve proper timing of the second impact (or subsequent impacts). The phase compensation value determination routine is ended at step 780.

Details of the determination of a magnitude of the second impact routine (step 752 in FIG. 7C2) are provided in FIG. 7E. To facilitate an understanding of this routine, reference is also made to FIGS. 1 and 8B. As a point of reference, it will be recalled that during the balance routine, after the first impact is applied, assuming the second imbalance B is not within a predetermined tolerance range, the controller 44 prepares to impart a second impact. As part of this preparation, in addition to determining a proper timing of the second impact, the controller 44 must ascertain a proper magnitude of the second impact as well. Notably, this same determination is suitably made for any subsequent impacts required to balance the disk pack 47.

The determination of a magnitude of the second impact routine begins at step 782. First, at 784, the controller 44 assigns a representative value Y to a magnitude of the first impact. In this regard, in one suitable embodiment, the magnitude of the first impact is the largest impact the solenoid 14 is able to generate, on the order of approximately 150 G's. Regardless of the exact magnitude, the representative value Y is suitably a whole number, between one and nine. For example, the representative value Y may be 8.

After assigning the representative value Y, the controller 44 determines a representative value Z for the second impact. The representative value Z is based upon the representative value Y, a magnitude of the second imbalance B and a magnitude of the correction value C. Determination of the correction value C was previously described. In general terms, however, the correction value C represents the amount of change between the first imbalance A and the second imbalance B, and is depicted graphically in FIG. 8B. The relationship of the second imbalance B with the correction value C provides a proportional indication of the amount of imbalance correction the first impact achieved, as well as the amount of further correction still required. Thus, in the example shown in FIG. 8B, the second imbalance B has a magnitude slightly less than a magnitude of the correction value C. In theory, then, if the second impact had the same magnitude as the first impact, "overcorrection" would occur, and the disk pack 47 imbalance would move to an opposite side of the disk pack 47. Therefore, the magnitude of the second impact is suitably reduced by the proportional relationship of the second imbalance B with the correction value C. In one embodiment, the representative value Z of the second impact is equal to the second imbalance B divided by the correction value C multiplied by the representative value Y of the first impact (i.e., Z=(B/C)Y). Thus, in the example of FIG. 8B, if the magnitude of the second imbalance B is 2 gm-mm and the magnitude of the correction value is 4 gm-mm, the representative value Z of the second impact would be 4.

The representative value Z of the first impact is then converted into a working number for operation of the solenoid 14 at step 788. Suitably, this conversion takes place through reference to an empirical formula previously stored by the controller 44. For example, the working number may be a firing period for the solenoid 14. In one embodiment, the solenoid 14 functions by being powered for a certain firing period called for by the controller 44. The greater the firing period, the larger the resulting impact. Thus, the representative value Z may be converted into an associated firing period for the solenoid 14. The empirical formula may be expressed as a polynomial equation in which the representative value Z is the unknown.

The determination of the magnitude of the second impact routine ends at step 790. Notably, this routine will be repeated for any subsequently required impacts.

The final balance and tightening confirmation routine (step 714 in FIG. 7A) is described in greater detail in FIGS. 7F1–7F2. Reference is additionally made to FIG. 8C, which provides a graphical example of the final balance and tightening confirmation routine. As a point of reference, the final balance and tightening confirmation routine occurs after the disk pack 47 has been balanced, and the screws associated with the clamping mechanism tightened such that the disk pack 47 is secured to the spindle motor hub. The purpose of the final balance and tightening confirmation is twofold. First, it is possible that when tightening the screws, balance of the disk pack 47 may be negatively affected. Second, the screws may not be sufficiently tight to otherwise maintain balance of the disk pack 47. The final balance and tightening confirmation routine checks whether either of these two potential errors has occurred.

The final balance and tightening confirmation routine begins at step 794. First, at 796, the disk pack 47 is rotated to a known speed. An initial imbalance I is detected in the disk pack 47 at step 798. Similar to previous discussions, the initial imbalance I is represented by a vector in FIG. 8C, having a magnitude and a direction. The initial imbalance I is stored by the controller 44 as an initial imbalance signal.

The controller 44 then detects a motor index pulse M at step 800. Details on the motor index pulse M are provided above. It should be noted, however, that the motor index pulse M changes each time the spindle motor is stopped and then restarted. Thus, the motor index pulse M shown in FIG. 8C varies from the motor index pulse M depicted in FIG. 8B. Regardless of the exact rotational position, the motor index pulse M will be generated at the same time during each revolution of the spindle motor, and thus of the disk pack 47.

The controller 44 then correlates the initial imbalance I with the motor index pulse M at 802. More particularly, the controller 44 determines and records the angular difference between the motor index pulse M and a direction of the initial imbalance I. As a result, because the motor index pulse M occurs at a known rotational position of the disk pack 47, the rotational position of the initial imbalance I is also known.

Based upon the above correlation, the controller 44 applies a series of impacts to the base 32 at step 804. In this regard, each of the series of impacts is suitably applied when the initial imbalance I is closest to the point of contact H. The controller 44 refers to the above-described correlation to dictate this preferred timing. In the example of FIG. 8C, the initial imbalance I is 140 degrees "behind" the motor index pulse M (assuming counterclockwise rotation of the disk pack 47). Thus, the controller 44 will time each of the series of impacts to occur when the motor index pulse has rotated 140 degrees past the point of contact H. The controller 44 powers the solenoid 14 to provide a maximum impact for each of the series of impacts. For example, each of the series of impacts is on the order of 150 G's. Finally, the series of impacts includes approximately 10 impacts, although a greater or lesser number could be used.

Assuming that the screws were properly tightened, the series of impacts should not affect the initial imbalance I. In other words, the initial imbalance I should not move substantially, and should be within an acceptable tolerance range. The controller 44 confirms this by first detecting a final imbalance F at 806. The final imbalance F is shown in FIG. 8C as a vector having a magnitude and direction. In the example of FIG. 8C, the disk pack 47 imbalance did move slightly from the initial imbalance I to the final imbalance F.

At step 808, the controller 44 determines if the final imbalance F is within an accepted tolerance range (for example 0.4 gm-mm). If the final imbalance F is outside of the tolerance range specification, the balance routine, described previously with reference to FIGS. 7C1–7C2, is repeated to balance the disk pack 47. If the final imbalance F is within the tolerance range specification, the controller 44 then confirms whether the screws were properly tightened at step 810.

Confirmation of proper screw tightening includes comparing a magnitude of the initial imbalance I with a magnitude of the final imbalance F. If the difference between the initial imbalance I and the final imbalance F is outside of a tolerance range (for example, plus or minus 0.2 gm-mm), the controller 44 instructs the operator to stop the spindle motor and re-tighten all screws. Following this re-tightening, the final balance and tightening confirmation routine is repeated. Conversely, if the difference between the initial imbalance I and the final imbalance F is within the tolerance range, the controller 44 determines that the disk pack 47 has been properly balanced and secured to the spindle motor hub. The routine is then ended at step 812.

At various points throughout this specification, reference has been made to detecting an imbalance in the disk pack 47 (e.g., the first imbalance A, the second imbalance B, the initial imbalance I, and the final imbalance F). One suitable routine for detecting imbalance is provided in FIG. 7G, starting at step 814. Initially, the controller 44 receives a signal indicative of imbalance at 816. For example, as previously described with reference to FIG. 1, a uniform displacement transducer 41, such as Balmac (Hilliard, Ohio) Vibration Analyzer Model 216-D, is associated with the flex deck 30 otherwise maintaining the disk pack 47. With this configuration, the transducer 41 produces a sine wave indicative of imbalance, whereby, the amplitude of the sine wave equals the magnitude of the disk pack 47 imbalance. Thus, the transducer 41 provides a signal indicative of imbalance to the controller 44.

The controller 44 continuously samples the imbalance signal (generated by the transducer 41) at 818. In doing so, the controller generates and records a plurality of sample values, each sample value being representative of disk pack 47 imbalance. In other words, each of the sample values is the amplitude of an individual period of the sine wave generated by the transducer 41.

After recording a series of sample values, the controller 44 then compares two consecutive sample values at step 820. The purpose of this comparison is to prevent an outside noise source (such as, for example, the operator accidentally bumping the surface on which the balancing operation is being performed) from affecting the actual imbalance finally recorded by the controller 44. Thus, the controller 44 compares a first sample value with a second sample value. If the difference between the two sample values is outside of the designated range, the controller 44 disregards the first sample, and then compares the second sample value with a third sample value. The designated range is suitably ±0.005 gm-mm, although other range values may also be useful. The controller 44 repeats this comparison of two consecutive sample values until two consecutive sample values are found having a difference within the designated range.

At step 822, the controller 44 records as the disk pack 47 imbalance an average of the two consecutive sample values having a difference within the designated range. The detecting imbalance routine is then ended at 824.

It is to be understood that the above description is intended to be illustrative, and not restrictive. While described chiefly with respect to a disk drive embodiment, it is apparent to those skilled in the art that the method of shifting mass by subjecting an object to a momentum transferring force in a desired manner is useful in many other fields to balance rotating masses. In addition, other devices may benefit from the provision of equal simultaneous rotation provided to a plurality of fasteners. In addition, the heat shrink screws may also be used in different embodiments outside the area of disk drives.

We claim:

1. A method of centering a disk pack of a disk drive, the disk drive including a base rotatably supporting the disk pack, the method comprising:

rotating the disk pack; and while the disk pack is rotating:
 a) generating a reference timing signal;
 b) detecting a first imbalance in the rotating disk pack to produce a first imbalance signal;
 c) correlating the first imbalance signal with the reference timing signal to produce a first correlation value indicative of a location of the first imbalance relative to the reference timing signal;
 d) applying a first impact to the base to transfer sufficient momentum to the base causing the base to shift relative to the disk pack, the first impact applied based on the first correlation value;
 e) detecting a second imbalance in the rotating disk pack to produce a second imbalance signal, the second imbalance resulting from the first impact;
 f) correlating the second imbalance signal with the reference timing signal to produce a second correlation value indicative of a location of the second imbalance relative to the reference timing signal;
 g) determining a phase compensation value based on the first and second correlation values, the phase compensation value indicative of a phase difference between an actual location of the first imbalance and a desired location of the first imbalance when the first impact was applied; and
 h) applying a second impact to the base to transfer sufficient momentum to the base causing the base to shift relative to the disk pack, the second impact applied based on the phase compensation value.

2. The method of claim 1, wherein the desired location is approximately opposite a location on the base where the impacts are applied.

3. The method of claim 1, wherein the phase compensation value is further based upon a correction value, the correction value indicative of a difference between the first imbalance and the second imbalance.

4. The method of claim 1, wherein the phase compensation value is further indicative of a difference between an actual timing of the first impact and a desired timing of the first impact, the method further comprising:

evaluating whether the actual timing of the first impact was before or after the desired timing of the first impact.

5. The method of claim 1, further comprising:

determining an amount of change between the first imbalance and the second imbalance to provide a correction value; and comparing the correction value with a magnitude of the first imbalance to determine whether the first impact overcorrected the first imbalance.

6. The method of claim 1, wherein step h) includes:

determining a magnitude of the second impact prior to imparting the second impact.

7. The method of claim 6, wherein the magnitude of the second impact is based upon a magnitude of the first impact and the second imbalance signal.

8. The method of claim 7, wherein the second imbalance signal provides a magnitude of the second imbalance and a magnitude of a correction value, the correction value indicative of an amount of change between the first imbalance and the second imbalance.

9. The method of claim 8, wherein the magnitude of the second impact is defined by a ratio of the magnitude of the second imbalance to a magnitude of the correction value multiplied by the magnitude of the first impact.

10. The method of claim 1, further comprising:

before step b):

repeatedly applying impacts to the base to transfer sufficient momentum to the base causing the base to shift relative to the disk pack to generate the first imbalance, the first imbalance being relatively uniform in the disk pack.

11. The method of claim 10, wherein repeatedly applying impacts to the base includes:

applying about 20 impacts over a time period in the range of approximately 5–15 seconds.

12. The method of claim 1, further comprising:

after step h):

stopping rotation of the disk pack;

clamping the disk pack to prevent further radial movement of the disk pack;

rotating the disk pack; and while the disk pack is rotating:
 detecting an initial imbalance;
 applying a final impact to the base;
 detecting a final imbalance; and
 comparing the initial imbalance with the final imbalance to determine if the final imbalance is within a predetermined range of the initial imbalance.

13. The method of claim 12, wherein the range is about 0.2 gm-mm.

14. The method of claim 1, further comprising:

sampling a signal indicative of imbalance to provide a plurality of sample values;

reviewing the plurality of sample values for two consecutive sample values having a difference within a predetermined range; and averaging the two consecutive sample values to provide the first imbalance.

\* \* \* \* \*